US012090841B2

(12) United States Patent
Onishi

(10) Patent No.: US 12,090,841 B2
(45) Date of Patent: Sep. 17, 2024

(54) VEHICULAR AXLE DEVICE

(71) Applicant: Hitachi Construction Machinery Co., Ltd., Tokyo (JP)

(72) Inventor: Tomohiro Onishi, Kasumigaura (JP)

(73) Assignee: Hitachi Construction Machinery Co., Ltd, Tokyo (JP)

( * ) Notice: Subject to any disclaimer, the term of this patent is extended or adjusted under 35 U.S.C. 154(b) by 0 days.

(21) Appl. No.: 18/280,007

(22) PCT Filed: Mar. 14, 2022

(86) PCT No.: PCT/JP2022/011328
§ 371 (c)(1),
(2) Date: Sep. 1, 2023

(87) PCT Pub. No.: WO2022/215447
PCT Pub. Date: Oct. 13, 2022

(65) Prior Publication Data
US 2024/0157786 A1     May 16, 2024

(30) Foreign Application Priority Data
Apr. 5, 2021  (JP) ................ 2021-064128

(51) Int. Cl.
*B60K 17/16* (2006.01)
*B60K 23/04* (2006.01)

(52) U.S. Cl.
CPC ........ *B60K 17/16* (2013.01); *B60K 2023/046* (2013.01)

(58) Field of Classification Search
CPC ... B60K 17/16; B60K 2023/046; F16H 48/08; F16H 48/30; F16H 48/22
See application file for complete search history.

(56) References Cited

U.S. PATENT DOCUMENTS 2,913,928 A * 11/1959 Double ................ F16H 48/08
475/86
4,526,063 A * 7/1985 Oster ................... F16H 48/08
475/237

(Continued)

FOREIGN PATENT DOCUMENTS

JP   58-149440 A   9/1983
JP   61-140242 A   6/1986

(Continued)

OTHER PUBLICATIONS

International Search Report (PCT/ISA/210) issued in PCT Application No. PCT/JP2022/011328 dated May 24, 2022 with English translation (4 pages).

(Continued)

*Primary Examiner* — Laura Freedman
(74) *Attorney, Agent, or Firm* — Crowell & Moring LLP

(57) ABSTRACT

A differential case (23) is therein provided with a plurality of rotating discs (38) that are spline coupled to an outer peripheral side of a right side gear (35), and a plurality of non-rotating discs (39) that are arranged between the respective rotating discs (38). A pressure ring (43) is disposed between a right retainer (41) and the rotating disc (38). The right retainer (41) is provided with a piston (46) that applies a load to the pressure ring (43) to bring the rotating discs (38) and the non-rotating discs (39) into frictional contact. A lever member (53) is disposed between the differential case (23), the right side gear (35) and the pressure ring (43). The lever member (53) transmits a reaction force due to the engagement between the pinion gear (33) and the right side gear (35) to the pressure ring (43) to control a load to be applied to the pressure ring (43) from the piston (46).

4 Claims, 14 Drawing Sheets

(56) References Cited

U.S. PATENT DOCUMENTS

| | | | | |
|---|---|---|---|---|
| 4,644,823 A | * | 2/1987 | Mueller | F16H 48/30 475/86 |
| 4,679,463 A | * | 7/1987 | Ozaki | B60K 23/04 475/86 |
| 4,763,749 A | * | 8/1988 | Miura | B60K 17/3462 475/221 |
| 4,811,628 A | * | 3/1989 | Winkam | F16H 48/08 475/86 |
| 4,867,010 A | * | 9/1989 | Stettler, Jr. | F16H 48/34 475/86 |
| 4,872,373 A | * | 10/1989 | Ouchi | B60K 23/04 475/86 |
| 4,895,236 A | * | 1/1990 | Sakakibara | F16D 48/064 192/84.91 |
| 4,934,213 A | * | 6/1990 | Niizawa | F16H 48/34 475/86 |
| 4,966,250 A | * | 10/1990 | Imaseki | B60K 23/0808 475/86 |
| 5,133,696 A | * | 7/1992 | Kobayashi | F16H 48/30 192/106 F |
| 5,279,401 A | * | 1/1994 | Stall | F16H 63/3026 192/52.4 |
| 5,310,388 A | * | 5/1994 | Okcuoglu | F16D 43/284 475/88 |
| 5,690,201 A | * | 11/1997 | Gassmann | F16D 43/284 192/103 FA |
| 5,911,291 A | * | 6/1999 | Suetake | F16D 27/115 192/84.91 |
| 6,120,408 A | * | 9/2000 | Yates, III | F16H 48/08 192/82 T |
| 6,561,939 B1 | | 5/2003 | Knapke | |
| 6,620,072 B1 | | 9/2003 | Salg | |
| 6,808,037 B1 | * | 10/2004 | Mueller | B60K 17/16 180/247 |
| 6,837,821 B2 | * | 1/2005 | Teraoka | F16H 48/30 475/233 |
| 6,857,982 B2 | * | 2/2005 | Tomari | F16H 48/34 475/234 |
| 6,991,572 B2 | * | 1/2006 | Chung | F16H 48/30 475/86 |
| 10,495,164 B2 | * | 12/2019 | Kurihara | B60T 13/665 |
| 11,118,664 B2 | * | 9/2021 | Zink | F16D 23/12 |
| 11,143,281 B2 | * | 10/2021 | Onishi | F16H 48/32 |
| 2012/0316024 A1 | * | 12/2012 | Weber | F16H 57/0409 475/160 |
| 2020/0408294 A1 | | 12/2020 | Onishi | |

FOREIGN PATENT DOCUMENTS

| | | | |
|---|---|---|---|
| JP | 61175339 A | * | 8/1986 |
| JP | 61-215834 A | | 9/1986 |
| JP | 63-106140 A | | 5/1988 |
| JP | 4-351353 A | | 12/1992 |
| JP | 8-25995 A | | 1/1996 |
| JP | H1019108 A | * | 1/1998 |
| JP | 2003-184993 A | | 7/2003 |
| JP | 2010-179696 A | | 8/2010 |
| JP | 2020-26870 A | | 2/2020 |

OTHER PUBLICATIONS

Japanese-language Written Opinion (PCT/ISA/237) issued in PCT Application No. PCT/JP2022/011328 dated May 24, 2022 with English translation (6 pages).

* cited by examiner

VEHICULAR AXLE DEVICE

TECHNICAL FIELD

The present invention relates to a vehicular axle device to be used suitably for a wheel type construction machine such as a wheel loader and a wheel type hydraulic excavator, for example.

BACKGROUND ART

There is known a wheel loader as a representative example of a wheel type construction machine, for example. The wheel loader is provided with a vehicle body provided with an axle device for driving left and right wheels and a working mechanism attached on the vehicle body. A differential mechanism is disposed in the axle device of the vehicle body, and the differential mechanism distributes drive torque from a drive source to left and right axle shafts in accordance with loads acting on left and right wheels (drive wheels).

The differential mechanism mounted on the wheel loader is usually provided with a limited slip differential device. The limited slip differential device limits an operation of the differential mechanism in accordance with a magnitude of the drive torque to satisfy both of traveling performance and revolving performance of the wheel loader (Patent Document 1). In this limited slip differential device of torque proportional type, the differential is limited according to the increasing drive torque and the limit of the differential is released according to the decreasing drive torque. Accordingly, in this limited slip differential device of torque proportional type, the differential torque (a torque difference between the left and right axle shafts) is uniquely determined in accordance with the magnitude of the drive torque.

The wheel loader changes largely in a traveling state depending upon a ground road surface state or working content of a working site. Therefore, in a case where assuming that the wheel loader travels on a pavement surface, the differential torque is in advance set to be small, there is posed a problem that the drive wheel of the wheel loader tends to be easily slipped. On the other hand, in a case where the differential torque is in advance set to be large, there is posed a problem that the operation of the differential mechanism is not appropriately made at the revolving travel and losses (for example, abrasion of wheels, an increase of steering forces, and deterioration of fuel consumption) due to absorbing a difference between inner and outer wheels are large.

The wheel type construction machine such as the wheel loader can preferably adjust the differential torque by the limited slip differential device in accordance with the ground road surface state or the traveling state as needed. There is known a variable limited slip differential device that can variably adjust the differential torque and in the differential mechanism of which a friction clutch and an actuator are arranged (Patent Document 2). In the variable limited slip differential device, an operation of the differential mechanism is controlled by driving the friction clutch by the actuator, making it possible to adjust the differential torque. As to the actuator in the variable limited slip differential device, proposed is an actuator by a driving force of a motor (Patent Document 3), by an electromagnetic force of an electromagnet (Patent Document 4), by a pushing force of a piston operable by an air pressure (Patent Document 5), by a pushing force of a piston operable by a fluid pressure (Patent Document 6) or the like. In addition, proposed is a device that predicts drive torque to be distributed to front and rear axle shafts from hydraulic pressures supplied to a boom cylinder and a bucket cylinder mounted on a wheel loader to control an operation of a limited slip differential device (Patent Document 7).

PRIOR ART DOCUMENT

Patent Document

Patent Document 1: Japanese Patent Laid-Open No. 58-149440
Patent Document 2: U.S. Pat. No. 6,620,072
Patent Document 3: Japanese Patent Laid-Open No. 2003-184993
Patent Document 4: Japanese Patent Laid-Open No. 8-25995
Patent Document 5: Japanese Utility Model Laid-Open No. 61-140242
Patent Document 6: Japanese Patent Laid-Open No. 63-106140
Patent Document 7: Japanese Patent Laid-Open No. 2010-179696

SUMMARY OF THE INVENTION

The differential mechanism provided with the variable limited slip differential device according to the conventional technology has an object of suppressing excessive loads or torque from acting on a shaft (an output shaft) of the limited split differential device, such as an axle shaft or the like to shorten a lifetime of the shaft. Therefore, for example, in the limited slip differential device provided with the piston operable by the fluid pressure, the drive torque acting on the shaft is predicted (figured out) and the piston limits the operation of the clutch in accordance with the predicted drive torque, thus adjusting the differential torque.

However, various kinds of the sensors and control devices are required for predicting the drive torque of a shaft and a hydraulic control circuit and the like are required to control an operation of a piston in accordance with the predicted drive torque. Therefore, there is a problem that the cost for the differential mechanism including the limited slip differential device increases.

An object of the present invention is to provide a vehicular axle device that can mechanically adjust differential torque in accordance with drive torque.

The present invention is applied to a vehicular axle device, comprising: left and right axle shafts to which left and right wheels are respectively attached; a hollow differential body that is disposed between left and right axle tubes for accommodating the left and right axle shafts and on both sides of which in a left-right direction partition walls each having a through hole penetrating in the left-right direction are respectively arranged; and a differential mechanism that is disposed between the left and right partition walls of the differential body to transmit a rotational force of a drive source to the left and right axle shafts, wherein the differential mechanism includes: a differential case that is rotatably supported on left and right retainers respectively attached in the through holes of the left and right partition walls and is rotated by the drive source; a pinion gear that is disposed in the differential case and rotates together with the differential case; left and right side gears that are arranged in the differential case and are engaged with the pinion gear; and left and right transmission shafts that are connected to the left and right side gears to transmit the rotation of the differential case to the left and right axle shafts, characterized in that: the differential case is provided therein with a plurality of rotating discs that are spline coupled to an outer peripheral side of one side gear of the left and right side gears and a plurality of non-rotating discs that are arranged between the plurality of rotating discs and are non-rotatable relative to the differential case and are movable relative to the differential case in the left-right direction; a pressure ring is disposed between one retainer of the left and right retainers positioned in the one side gear-side and the non-rotating disc to press the rotating discs toward the non-rotating discs; an actuator is disposed in the one retainer-side, the actuator applying a load on the pressure ring to bring the rotating discs and the non-rotating discs into contact and couple the left and right transmission shafts; and a lever member is disposed between the differential case, the one side gear and the pressure ring, the lever member transmitting a reaction force due to the engagement between the pinion gear and the one side gear to the pressure ring to control the load to be applied to the pressure ring from the actuator.

According to the present invention, utilizing that the reaction force due to the engagement between the pinion gear and the one side gear increases in proportion to the drive torque, the engaging reaction force can be transmitted via the lever member to the pressure ring. Thereby, the load applied to the pressure ring from the actuator is mechanically lowered, making it possible to mechanically reduce the differential torque to be small in accordance with the increasing drive torque, and therefore, a lifetime of the left and right axle shafts can be extended.

MODE FOR CARRYING OUT THE INVENTION

Hereinafter, descriptions will be in detail made by taking a case where vehicular axle devices according to an embodiment are mounted on a wheel loader, as an example with reference to FIG. 1 to FIG. 22. It should be noted that in the embodiment a traveling direction of the wheel loader is defined as a front-rear direction and a direction perpendicular to the traveling direction of the wheel loader is defined as a left-right direction.

Figure 1:
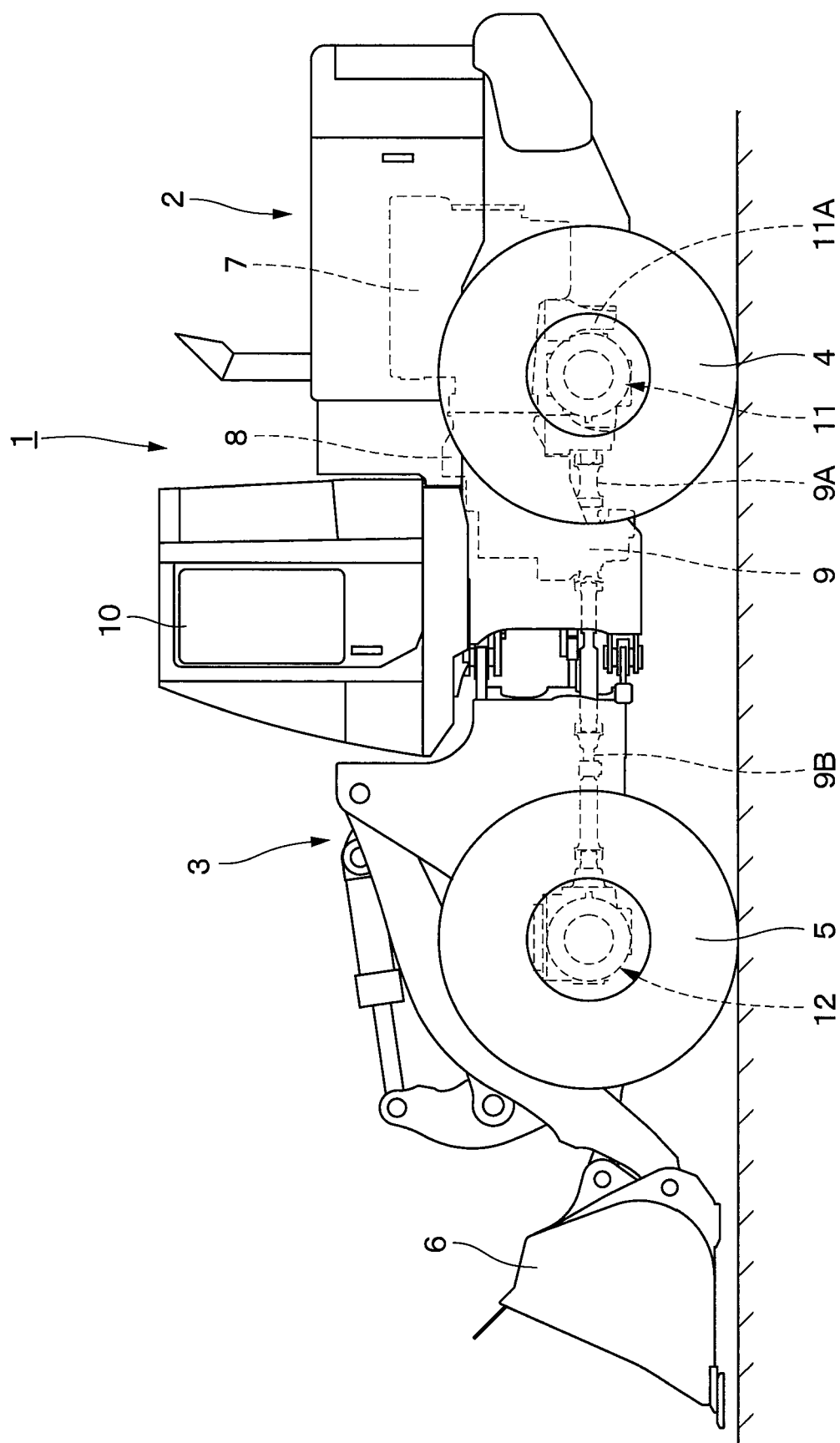
FIG. 1 is a left side view illustrating a wheel loader provided with vehicular axle devices according to an embodiment of the present invention.

In FIG. 1, a wheel loader 1 includes a rear vehicle body 2, a front vehicle body 3, rear wheels 4, front wheels 5, and a working mechanism 6 that is disposed on the front side of the front vehicle body 3. The front vehicle body 3 is coupled to the front side of the rear vehicle body 2 to be capable of swinging in a left-right direction. The rear wheels 4 are arranged in both sides of the rear vehicle body 2 in the left-right direction, and the front wheels 5 are arranged in both sides of the front vehicle body 3 in the left-right direction.

The rear vehicle body 2 is provided thereon with an engine 7 as a drive source, a torque converter 8, a transmission 9, a hydraulic pump (not shown) and the like. The transmission 9 is connected to a rear axle device 11 through a propeller shaft 9A extending in a front-rear direction and is connected to a front axle device 12 through a propeller shaft 9B. A cab 10 in which an operator gets is disposed on the upper side of the rear vehicle body 2.

The rear axle device 11 is disposed on the lower side of the rear vehicle body 2. The rear axle device 11 is formed to extend in the left-right direction, and the rear wheels 4 are respectively mounted on both end parts of the rear axle device 11 in the left-right direction.

The front axle device 12 is disposed on the lower side of the front vehicle body 3. The front axle device 12 is formed to extend in the left-right direction as similar to the rear axle device 11, and the front wheels 5 are respectively mounted on both end parts of the front axle device 12 in the left-right direction.

The rear axle device 11 and the front axle device 12 are configured in the same way with each other except for a point where connection positions of the propeller shafts 9A, 9B differ. Therefore, in the present embodiment, an explanation will be in detail made of the configuration of the front axle device 12, and an explanation of the configuration of the rear axle device 11 is to be omitted.

The front axle device 12 is connected to the propeller shaft 9B to drive/rotate the left and right front wheels 5. The front axle device 12 includes, as illustrated in FIG. 2 and FIG. 3, a casing 13, a left axle shaft 19L, a right axle shaft 19R, a differential mechanism 20, a left planetary gear reduction mechanism 54L, a right planetary gear reduction mechanism 54R, a left brake mechanism 58L and a right brake mechanism 58R, which will be described later, and the like.

The casing 13 configures an outer shell of the front axle device 12. The casing 13 is provided with a hollow differential body 14 positioned in the immediate part in the left-right direction, a left axle tube 15L positioned on the left side of the differential body 14, a right axle tube 15R positioned on the right side of the differential body 14. The differential mechanism 20 and the left and right brake mechanisms 58L, 58R are accommodated in the differential body 14. The left axle shaft 19L is supported in the left axle tube 15L to be rotatable therein and the right axle shaft 19R is supported in the right axle tube 15R to be rotatable therein. The front wheels 5 are respectively attached to the front end sides of the left and right axle shafts 19L, 19R.

Figure 2:
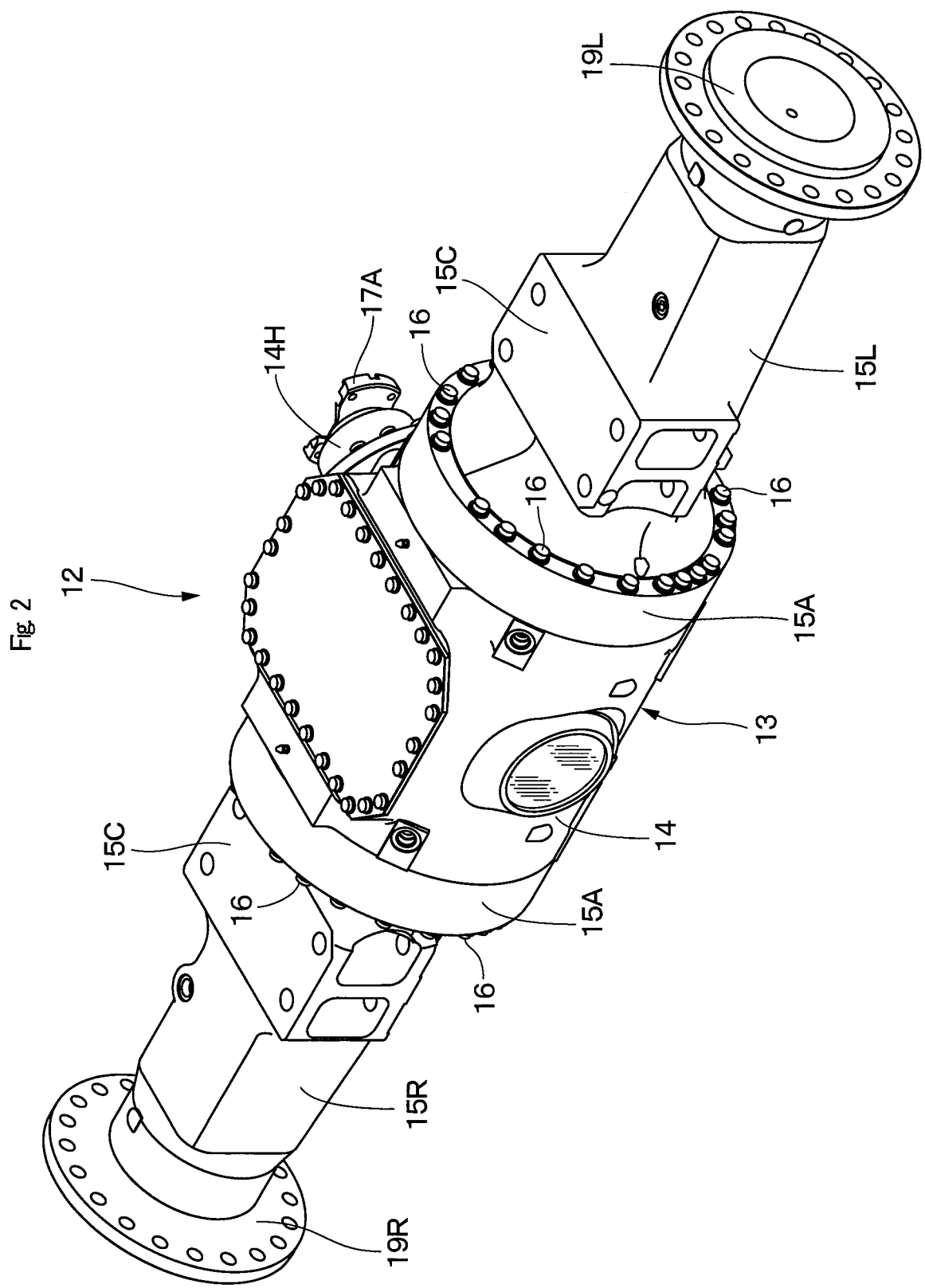
FIG. 2 is an outside appearance perspective view illustrating a front axle device as viewed from forward.
Figure 3:
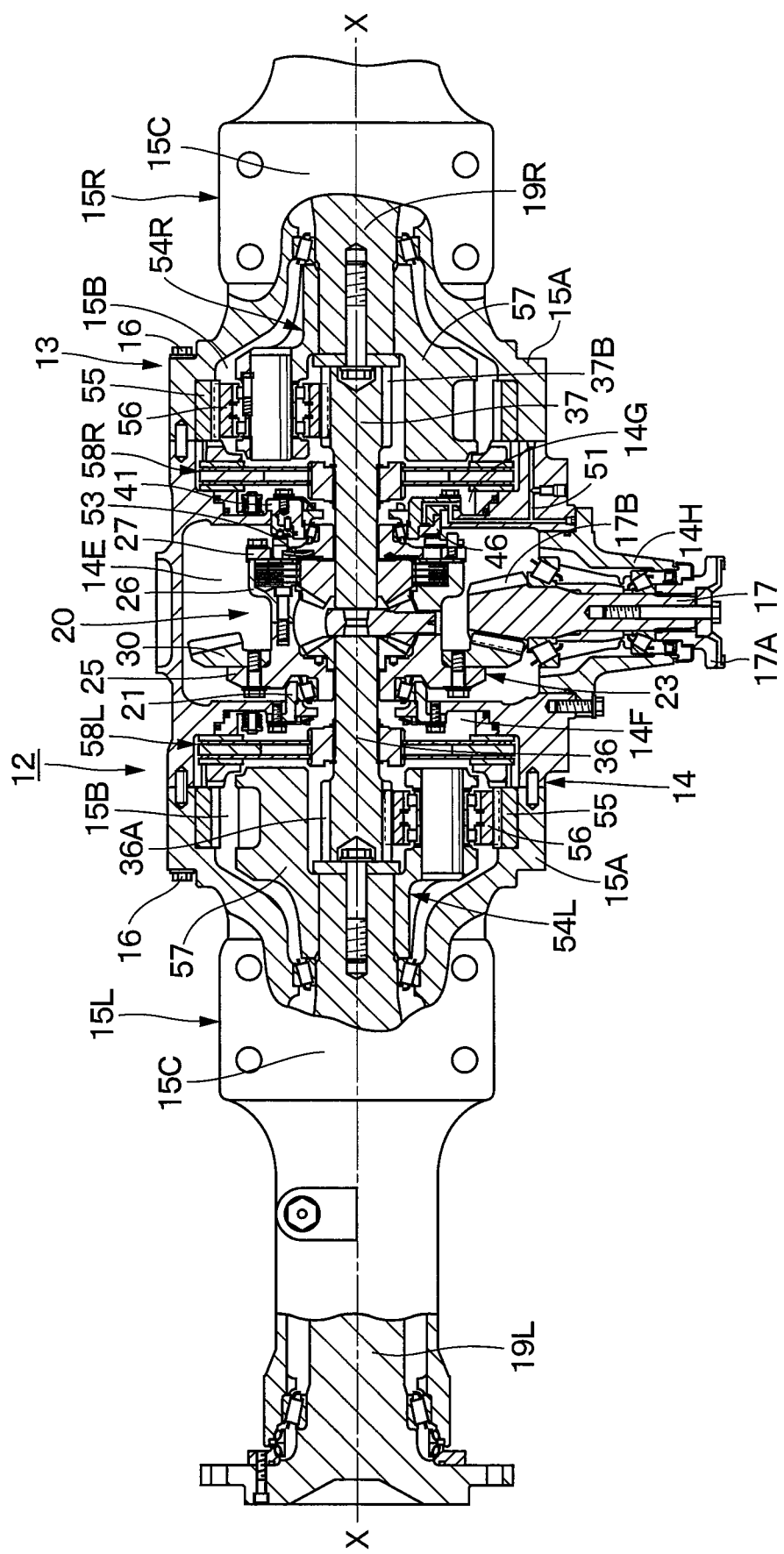
FIG. 3 is a cross section illustrating an internal structure of the front axle device.
Figure 4:
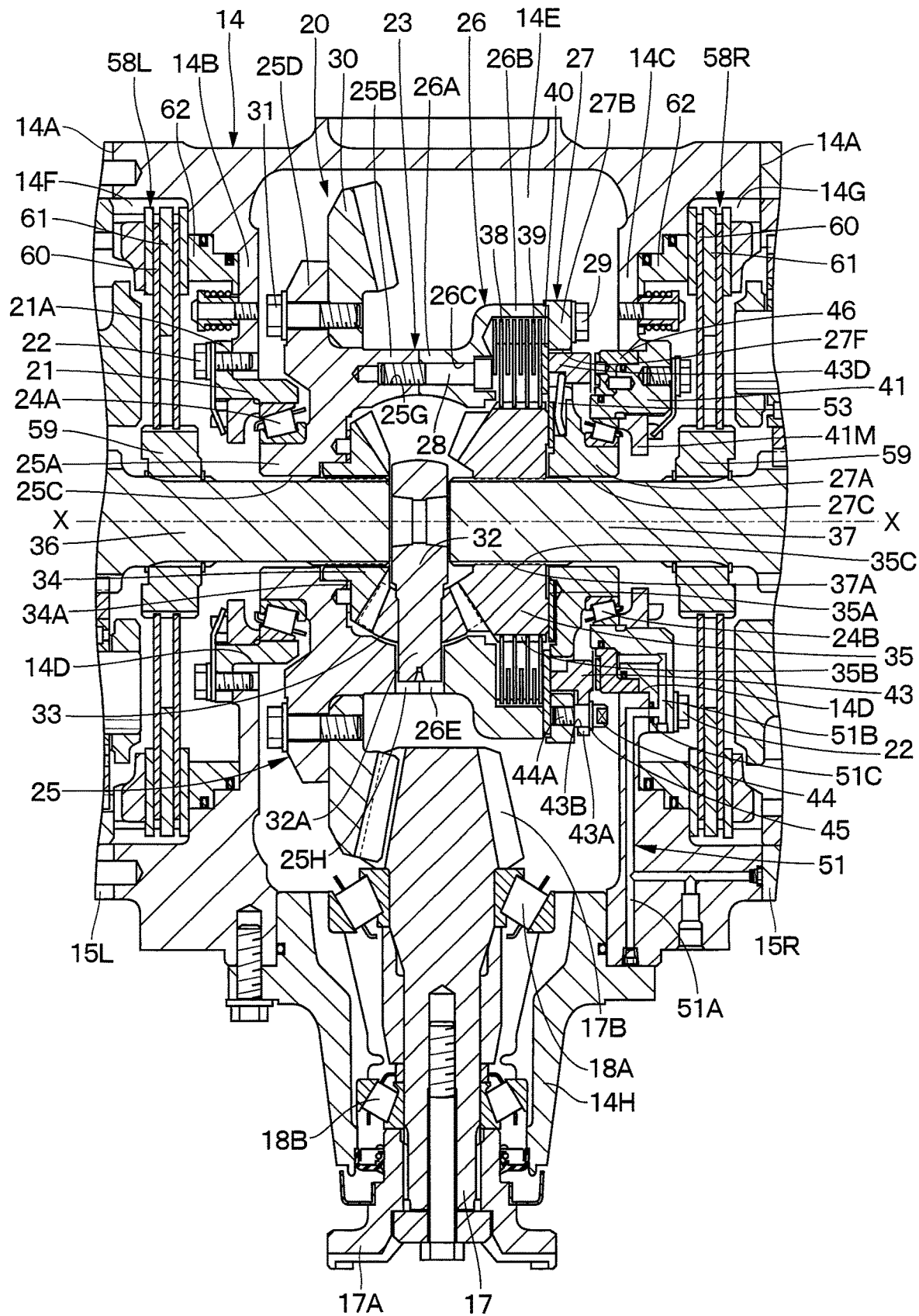
FIG. 4 is a cross section illustrating a differential mechanism in FIG. 3 in an enlarging manner.

As illustrated in FIG. 2 to FIG. 4, the differential body 14 is composed of a cylindrical tubular body centering at an axis X-X extending in the left-right direction (axially). The differential body 14 has a one-piece structure in which a left partition wall 14B and a right partition wall 14C, which will be described later, are integrally formed. Both ends of the differential body 14 in the left-right direction are respectively formed as opening ends 14A. The left partition wall 14B is disposed integrally with the left side of the differential body 14 and the right partition wall 14C is disposed integrally with the right side of the differential body 14. The left and right partition walls 14B, 14C each extend from an inner peripheral surface of a section deeper than the opening ends 14A to the radial inward. Through holes 14D respectively smaller in diameter than the opening ends 14A are formed in the left and right partition walls 14B, 14C to penetrate therethrough in the left-right direction (axially).

The inside of the differential body 14 is sectioned into a gear room 14E positioned between the left and right partition walls 14B, 14C, a left brake room 14F arranged in the left side of the gear room 14E, and a right brake room 14G arranged in the right side of the gear room 14E. The differential mechanism 20 is accommodated in the gear room 14E, the brake mechanism 58L is accommodated in the left brake room 14F, and the brake mechanism 58R is accommodated in the right brake room 14G. A projecting tube 14H is disposed on the rear side of the differential body 14 (in the rear axle device 11-side) to project toward the transmission 9. The projecting tube 14H opens to the gear room 14E, and a later-described input shaft 17 is supported in the projecting tube 14H to be rotatable therein.

Base end sides of the left axle tube 15L and the right axle tube 15R are respectively formed as shorter cylindrical bodies 15A. Each of the cylindrical bodies 15A has an outer radial dimension equal to each of both ends of the differential body 14 in the left-right direction. The insides of the left and right cylindrical bodies 15A are respectively formed as reduction gear rooms 15B, the planetary gear reduction mechanism 54L is accommodated in the left reduction gear room 15B and the planetary gear reduction mechanism 54R is accommodated in the right reduction gear room 15B. Front end sides of the left and right axle tubes 15L, 15R each are formed in an angular, tubular shape and extend outwards in the left-right direction from the cylindrical bodies 15A. The cylindrical bodies 15A of the left and right axle tubes 15L, 15R are attached to the opening ends 14A of the differential body 14 by using a plurality of bolts 16. The left and right axle tubes 15L, 15R extend to be smaller in diameter in the left-right direction from the differential body 14.

Mount parts 15C, each formed in a rectangular shape, are arranged on the top surface sides of the left and right axle tubes 15L, 15R to be adjacent to the cylindrical bodies 15A. The left and right mount parts 15C are attached to the front vehicle body 3 of the wheel loader 1. That is, the front axle device 12 is an inboard type of an axle device in which the differential mechanism 20, the left and right planetary gear reduction mechanisms 54L, 54R and the left and right brake mechanisms 58L, 58R are arranged between the mount parts 15C of the left and right axle tubes 15L, 15R. It should be noted that the rear axle device 11 is attached via an axle support 11A to the rear vehicle body 2 (refer to FIG. 1).

The input shaft 17 is disposed through two bearings 18A, 18B in the projecting tube 14H of the differential body 14 to be rotatable therein. One end of the input shaft 17 projects outside of the projecting tube 14H, and a connection flange 17A is disposed in the one end. The connection flange 17A is connected to the propeller shaft 9B. The other end of the input shaft 17 projects into the gear room 14E of the differential body 14, and a drive pinion 17B composed of a bevel gear is formed on the other end. The drive pinion 17B is engaged with a later-described ring gear 30.

The left axle shaft 19L is disposed to axially extend in the left axle tube 15L. The right axle shaft 19R is disposed to axially extend in the right axle tube 15R. The left and right axle shafts 19L, 19R are arranged on the axis X-X. The base end side of the left axle shaft 19L is spline coupled to a carrier 57 of the planetary gear reduction mechanism 54L. The front end side of the left axle shaft 19L projects from the left axle tube 15L, and the left front wheel 5 is attached to the front end part thereof. The base end side of the right axle shaft 19R is spline coupled to the carrier 57 of the planetary gear reduction mechanism 54R. The front end side of the right axle shaft 19R projects from the right axle tube 15R, and the right front wheel 5 is attached to the front end part thereof.

Next, an explanation will be made of the differential mechanism 20 according to the present embodiment.

The differential mechanism 20 is disposed in the gear room 14E in the differential body 14. The differential mechanism 20 distributes and transmits the drive force (rotational force) of the engine 7 as a drive source to the left and right front wheels 5 through the left and right axle shafts 19L, 19R. Here, the differential mechanism 20 is configured of a limited slip differential mechanism with a differential limit that temporarily becomes in a locking state (in a differential locking state) in association with a condition. The differential mechanism 20 includes a differential case 23, the ring gear 30, a plurality of pinion gears 33, a left side gear 34, a right side gear 35, a left transmission shaft 36, a right transmission shaft 37, a plurality of rotating discs 38, a plurality of non-rotating discs 39, a piston 46, a plurality of lever members 53, which will be described later, and the like.

A cylindrical left retainer 21 having a collar part 21A is attached into the through hole 14D of the left partition wall 14B configuring part of the differential body 14. The collar part 21A of the left retainer 21 is fixed on the left partition wall 14B by using bolts 22. In addition, a later-described right retainer 41 is attached into the through hole 14D of the right partition wall 14C configuring part of the differential body 14, and the right retainer 41 is fixed on the right partition wall 14C by using bolts 22.

The differential case 23 is disposed in the gear room 14E of the differential body 14. The differential case 23 is supported through bearings 24A, 24B on the left retainer 21 and the right retainer 41 to be rotatable on the axis X-X. The differential case 23 is formed as an outer shell of the differential mechanism 20, and is configured of a first case 25, a second case 26, and a third case 27.

Figure 6:
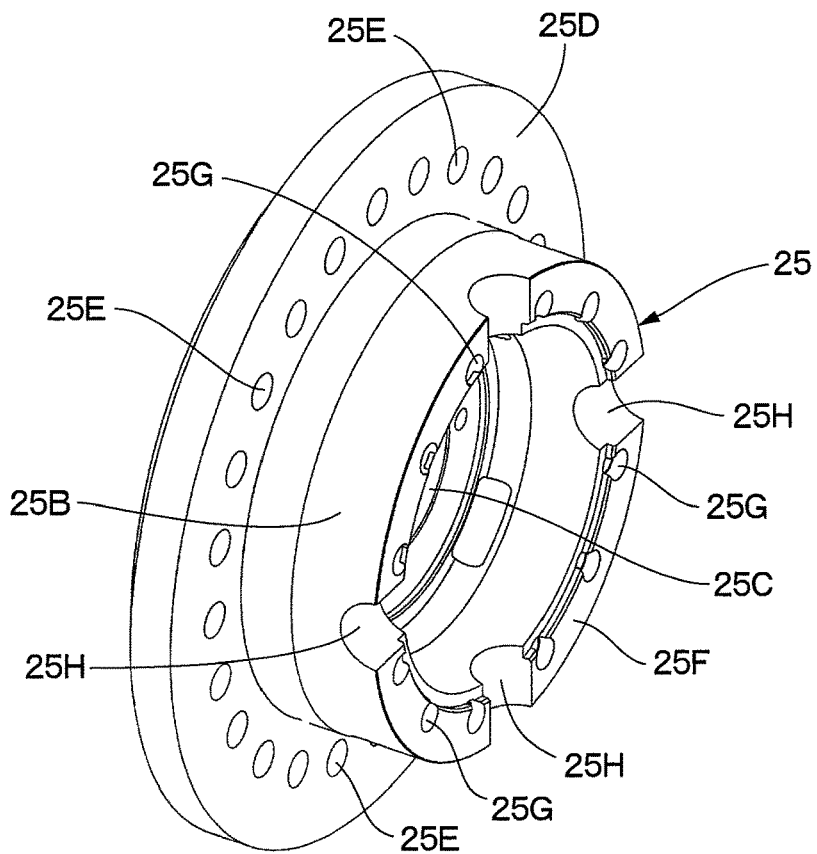
FIG. 6 is a perspective view illustrating a first case of a differential case as a unit.

As illustrated in FIG. 4 and FIG. 6, the first case 25 is a stepped cylindrical body having a small-diameter cylindrical body 25A and a large-diameter cylindrical body 25B. A shaft insert hole 25C is formed at the center part of the first case 25 to penetrate therethrough in the left-right direction. A disc-shaped collar part 25D having a large diameter is disposed between the small-diameter cylindrical body 25A and the large-diameter cylindrical body 25B. The small-diameter cylindrical body 25A is supported through the bearing 24 on the left retainer 21. A plurality of bolt insert holes 25E are formed in the collar part 25D over an entire periphery thereof. A plurality of screw holes (female screw holes) 25G are formed on an axial end surface 25F of the large-diameter cylindrical body 25B over an entire periphery thereof. In addition, four recessed parts 25H in a semicircle shape are formed on the axial end surface 25F of the large-diameter cylindrical body 25B at angular intervals of 90 degrees.

Figure 7:
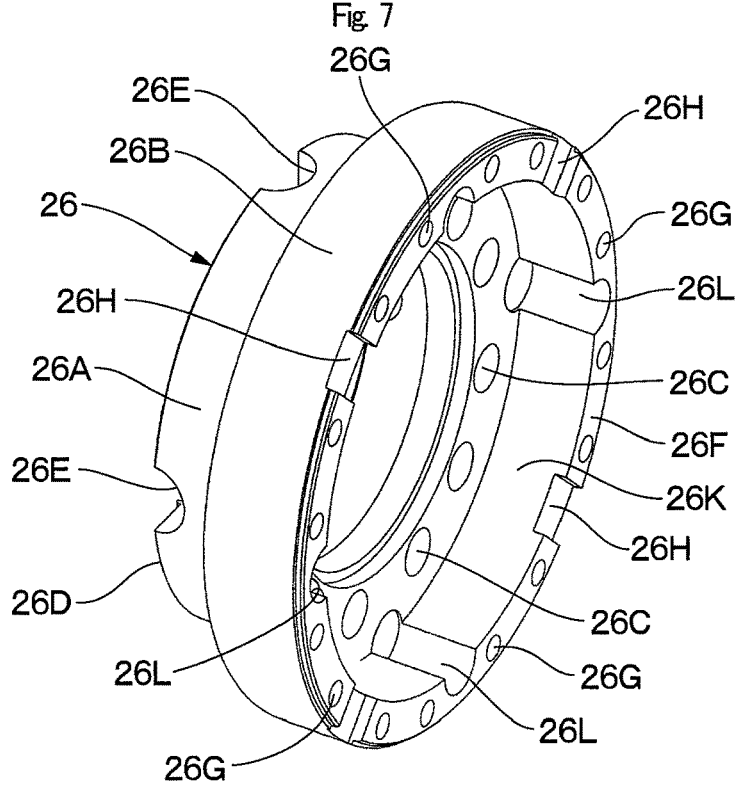
FIG. 7 is a perspective view illustrating a second case of the differential case as a unit.

As illustrated in FIG. 4 and FIG. 7, the second case 26 is formed as a hollow stepped cylindrical body having a small-diameter cylindrical body 26A and a large-diameter cylindrical body 26B. The small-diameter cylindrical body 26A has an outer diameter dimension and a thickness equal to those of the large-diameter cylindrical body 25B of the first case 25. A plurality of bolt insert holes 26C are formed in the small-diameter cylindrical body 26A over an entire periphery thereof to penetrate therethrough in the left-right direction. The plurality of bolt insert holes 26C correspond to the screw holes 25G of the first case 25. Four recessed parts 26E in a semicircle shape are formed on an axial end surface 26D of the small-diameter cylindrical body 26A at angular intervals of 90 degrees. The plurality of recessed parts 26E correspond to the recessed parts 25H of the first case 25. A plurality of screw holes 26G are formed on an axial end surface 26F of the large-diameter cylindrical body 26B over an entire periphery thereof. Four rectangular shallow engagement recessed parts 26H are formed on the axial end surface 26F at angular intervals of 90 degrees. Further, a plurality of (for example, four) recessed grooves 26L in a semicircle shape in section that axially extend are formed on an inner peripheral surface 26K of the large-diameter cylindrical body 26B at equal angular intervals. Projecting parts 39A of the non-rotating discs 39 to be described later are engaged with the plurality of recessed grooves 26L.

Figure 8:
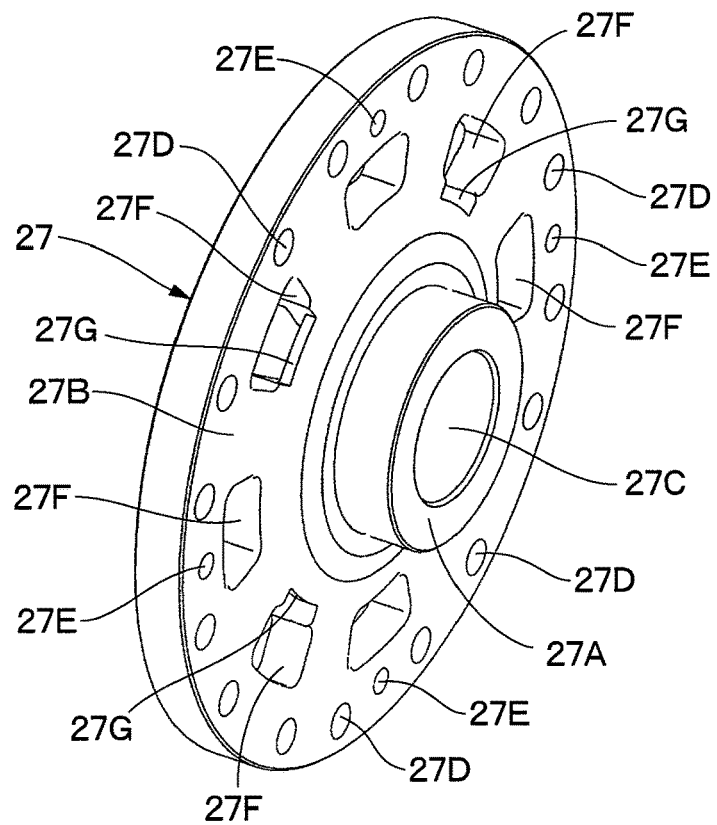
FIG. 8 is a perspective view illustrating a third case of the differential case as viewed from a cylindrical body-side.
Figure 9:
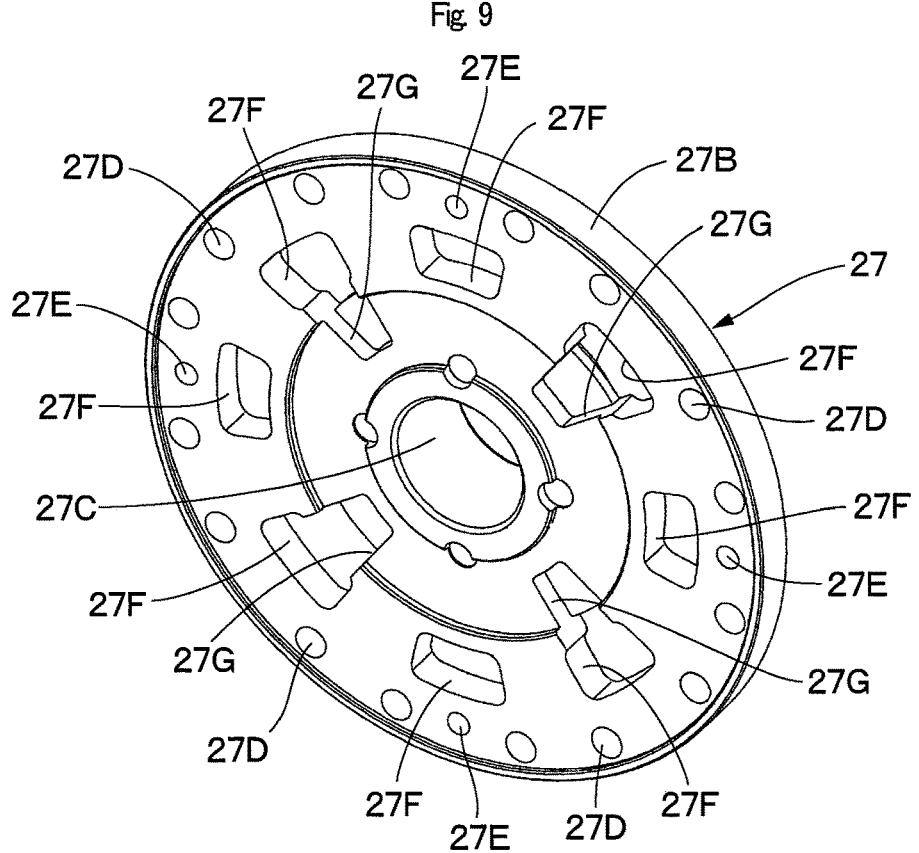
FIG. 9 is a perspective view illustrating the third case of the differential case as viewed from a collar part-side.

The third case 27 is attached to the second case 26 to be positioned at the opposite side to the first case 25 in the left-right direction. As illustrated in FIG. 4, FIG. 8 and FIG. 9, the third case 27 has a cylindrical body 27A and a disc-shaped collar part 27B larger in diameter than the cylindrical body 27A. The collar part 27B has an outer diameter dimension slightly larger than that of the large-diameter cylindrical body 26B of the second case 26, and an outer peripheral edge of the collar part 27B is fitted on the large-diameter cylindrical body 26B of the second case 26 from the outer peripheral side. A shaft insert hole 27C is formed at the center part of the third case 27 to axially penetrate therethrough. The cylindrical body 27A is supported through the bearing 24B on the right retainer 41. A plurality of bolt insert holes 27D are formed in the collar part 27B over an entire periphery thereof. The plurality of bolt insert holes 27D correspond to the screw holes 26G in the second case 26. In addition, four insert holes 27E, each smaller in diameter than the bolt insert hole 27D, are formed in the collar part 27B at angular intervals of 90 degrees. The four screw holes 27E correspond to pin insert holes 43B of a pressure ring 43 to be described later. A plurality of (for example, eight) rectangular holes 27F are formed in portions, which are positioned closer to the radial inward than the respective bolt insert holes 27D, of the collar part 27B to axially penetrate therethrough. Rectangular projections 43D of the pressure ring 43 are inserted in the plurality of rectangular holes 27F to be movable relative thereto. Lever member accommodating grooves 27G extending toward the center of the cylindrical body 27A are formed to be communicated with the four rectangular holes 27F arranged at angular intervals of 90 degrees out of the rectangular holes 27F. A lever member 53 is accommodated in the lever member accommodating groove 27G.

Bolts 28 are respectively inserted in the bolt insert holes 26C of the second case 26. The Bolts 28 are respectively threaded into the screw holes 25G of the first case 25. Thereby, the second case 26 is fixed to the first case 25. At this time, the axial end surface 25F of the first case 25 abuts on the axial end surface 26D of the second case 26 (small-diameter cylindrical body 26A). Shafts 32A of a later-described spider 32 are engaged between the recessed part 25H of the first case 25 and the recessed part 26E of the second case 26. In addition, bolts 29 are respectively inserted in the bolt insert holes 27D of the third case 27. The bolts 29 are respectively threaded into the screw holes 26G of the second case 26. Thereby, the third case 27 is fixed to the second case 26. In this way, the differential case 23 composed of the first case 25, the second case 26 and the third case 27 is assembled. The spider 32, the plurality of pinion gears 33, and the left and right side gears 34, 35 are arranged in the inside of the differential case 23.

The ring gear 30 is attached to the differential case 23 in the gear room 14E of the differential body 14. The ring gear 30 is formed of an annular bevel gear. The ring gear 30 is fixed to the collar part 25D of the first case 25 by a plurality of bolts 31 inserted in the bolt insert holes 25E of the first case 25. The ring gear 30 is engaged with the drive pinion 17B of the input shaft 17. Accordingly, the rotation of the engine 7 is transmitted through the transmission 9 to the input shaft 17, and the drive pinion 17B is engaged with the ring gear 30, thereby causing the differential case 23 to rotate.

The spider 32 is disposed within the differential case 23. The spider 32 has four Shafts 32A combined in a cross shape at angular intervals of 90 degrees. The front end sides of the four Shafts 32A are held tightly between the recessed part 25H of the first case 25 and the recessed part 26E of the second case 26 configuring part of the differential case 23. Accordingly, the spider 32 rotates together with the differential case 23.

The plurality of (four) pinion gears 33 are respectively supported on the four Shafts 32A arranged in the spider 32 to be rotatable thereon. The four pinion gears 33 each are composed of a bevel gear and are united by the spider 32. The pinion gears 33 are respectively engaged with the left side gear 34 and the right side gear 35 within the differential case 23.

The left side gear 34 and the right side gear 35 are respectively arranged in the differential case 23. The left and right side gears 34, 35 are paired in the left-right direction across the spider 32. In the present embodiment, the right side gear 35 configures one side gear of the left and right side gears 34, 35. The left and right side gears 34, 35 each are composed of a bevel gear, and are engaged with the four pinion gears 33 supported by the spider 32. A thrust plate 34A is disposed between the left side gear 34 and the first case 25 to reduce abrasion of the first case 25. A thrust plate 35A is disposed between the right side gear 35 and the third case 27 to reduce abrasion of the third case 27. In addition, a shaft spline part 35B is formed on an outer peripheral surface of the right side gear 35, and a hole spline part 35C is formed on an inner peripheral surface of the right side gear 35.

The left transmission shaft 36 is connected to the left side gear 34. The right transmission shaft 37 is connected to the right side gear 35. The left transmission shaft 36 and the right transmission shaft 37 are arranged to be paired on the axis X-X. The left transmission shaft 36 transmits the rotation of the differential case 23 through the planetary gear reduction mechanism 54L to the left axle shaft 19L. The right transmission shaft 37 transmits the rotation of the differential case 23 through the planetary gear reduction mechanism 54R to the right axle shaft 19R.

The base end side of the left transmission shaft 36 is spline coupled to an inner peripheral side of the left side gear 34. The left transmission shaft 36 extends through the left partition wall 14B of the differential body 14 into the left axle tube 15L. A sun gear 36A configuring part of the planetary gear reduction mechanism 54L is formed integrally with the front end of the left transmission shaft 36. On the other hand, a shaft spline part 37A is disposed in the base end side of the right transmission shaft 37, and the shaft spline part 37A is spline coupled to the hole spline part 35C of the right side gear 35. The right transmission shaft 37 extends through the right partition wall 14C of the differential body 14 into the right axle tube 15R, and a sun gear 37B configuring part of the planetary gear reduction mechanism 54R is formed integrally with the front end of the right transmission shaft 37.

The plurality of rotating discs 38 and the plurality of non-rotating discs 39 are arranged between the inner peripheral surface 26K of the second case 26 configuring part of the differential case 23 and the shaft spline part 35B of the right side gear 35. The plurality of rotating discs 38 and the plurality of non-rotating discs 39 each are composed of an annular plate body and are arranged to alternately overlap axially.

Figure 10:
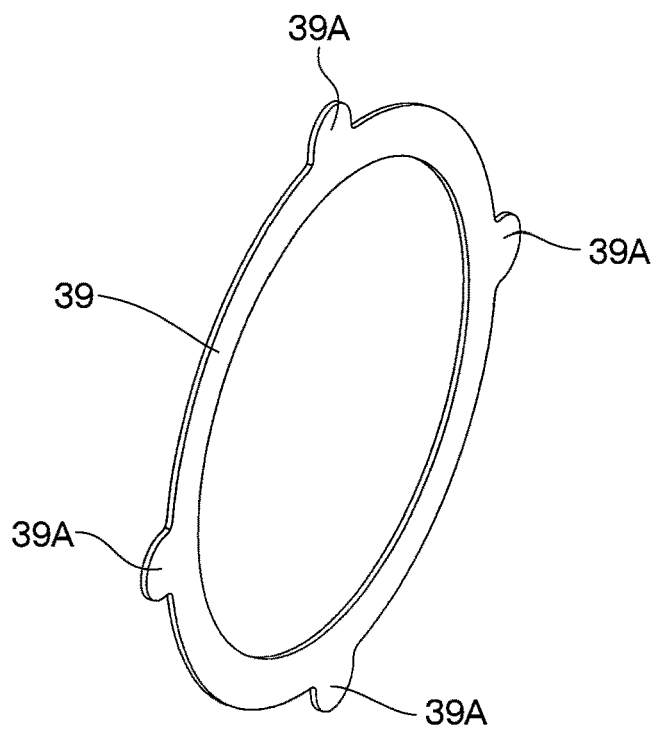
FIG. 10 is a perspective view illustrating a non-rotating disc as a unit.

The rotating discs 38 are spline coupled on the inner peripheral side to the shaft spline part 35B of the right side gear 35. Accordingly, the rotating discs 38 are rotatable relative to the differential case 23 together with the right side gear 35 in a state of being movable in an axial direction of the right side gear 35. As illustrated in FIG. 10, each of the non-rotating discs 39 is provided with four semi-circular projecting parts 39A that project to the radial outward at angular intervals of 90 degrees on the outer peripheral side. The plurality of projecting parts 39A are respectively engaged with the recessed grooves 26L formed on the inner peripheral surface 26K of the second case 26. Accordingly, the non-rotating discs 39 are held in a state of being movable in an axial direction of the differential case 23 in a state of being non-rotatable relative to the differential case 23.

Figure 11:
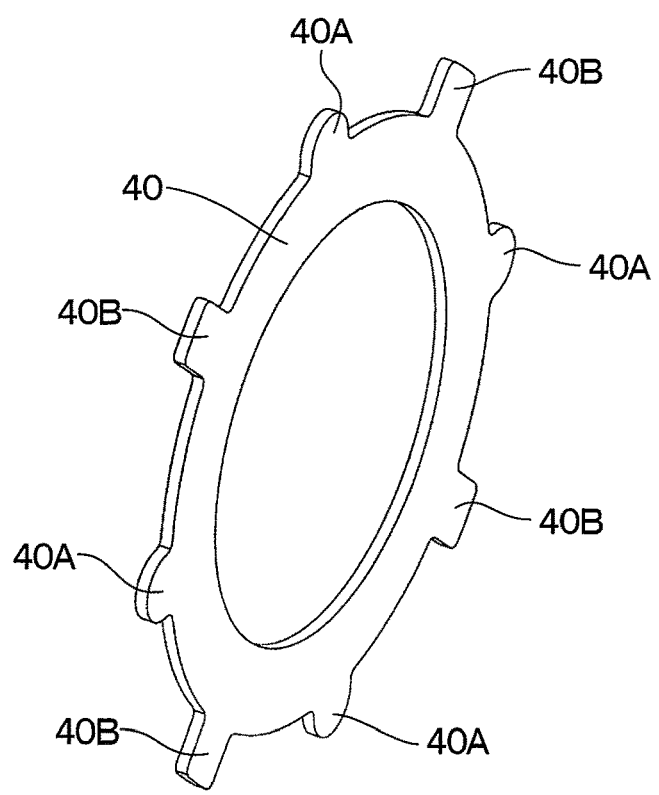
FIG. 11 is a perspective view illustrating a pressing plate as a unit.

A pressing plate 40 is disposed between the third case 27 and the non-rotating disc 39 to be positioned within the differential case 23. As illustrated in FIG. 11, the pressing plate 40 is formed of an annular plate body, and four semi-circular projecting parts 40A are arranged on the outer peripheral side of the pressing plate 40 to project to the radial outward at angular intervals of 90 degrees. The four semi-circular projecting parts 40A are respectively engaged with the recessed grooves 26L of the second case 26. Accordingly, the pressing plate 40 rotates together with the differential case 23 in a state of being axially movable along the respective recessed grooves 26L. Four rectangular projecting parts 40B are arranged on the outer peripheral side of the pressing plate 40 in positions different from those of the semi-circular projecting parts 40A to project to the radial outward at angular intervals of 90 degrees. The four rectangular projecting parts 40B are engaged with (abut on) the engagement recessed parts 26H of the second case 26 to regulate the movement quantity in a direction to come close to the rotating disc 38 of the pressing plate 40.

The right retainer 41 is attached to the through hole 14D of the right partition wall 14C configuring part of the differential body 14. The right retainer 41 configures one retainer positioned in the right side gear 35-side. As illustrated in FIG. 5 to FIG. 12, the right retainer 41 is provided with a cylindrical body 41A that is formed in a stepped cylindrical shape and is fitted in the through hole 14D, and a collar part 41B larger in diameter than the cylindrical body 41A. A plurality of bolt insert holes 41C are formed in the collar part 41B of the right retainer 41 over an entire periphery thereof. Bolts 22 are inserted in the respective bolt insert holes 41C, and the bolts 22 is respectively threaded into a screw holes 14J (refer to FIG. 18) arranged in the right partition wall 14C of the differential body 14. Thereby, the right retainer 41 is attached to the right partition wall 14C in a state where the cylindrical body 41A is fitted into the through hole 14D.

A piston accommodating part 41D having a step part of two steps is formed on an outer peripheral surface of the cylindrical body 41A configuring part of the right retainer 41. This piston accommodating part 41D is composed of a large-diameter step part 41E and a small-diameter step part 41F that are axially adjacent with each other, and the later-described piston 46 is attached to the piston accommodating part 41D. An annular groove 41G is disposed on an outer peripheral surface of the large-diameter step part 41E, and an annular groove 41H is disposed on an outer peripheral surface of the small-diameter step part 41F. O-rings 42 are respectively attached to the annular grooves 41G, 41H to maintain liquid-tight sealing between the piston 46 and the right retainer 41 (piston accommodating part 41D). An entire peripheral groove 41K is formed on an end surface 41J of the piston accommodating part 41D positioned in a boundary part between the large-diameter step part 41E and the small-diameter step part 41F. The entire peripheral groove 41K forms a later-described hydraulic chamber 47 between the piston 46 and the entire peripheral groove 41K, and a retainer-side oil passage 51B to be described later opens to the bottom part of the entire peripheral groove 41K. A plurality of (for example, four) pin holes 41L are arranged on the bottom part of the entire peripheral groove 41K. The pin holes 41L are arranged at angular intervals of 90 degrees, and one end of each of later-described pins 48 is fitted thereinto. Further, a nut 41M is threaded on an inner peripheral side of the right retainer 41. The nut 41M axially gives pressures to the bearing 24 between the nut 41M and the cylindrical body 27A of the third case 27.

Figure 13:
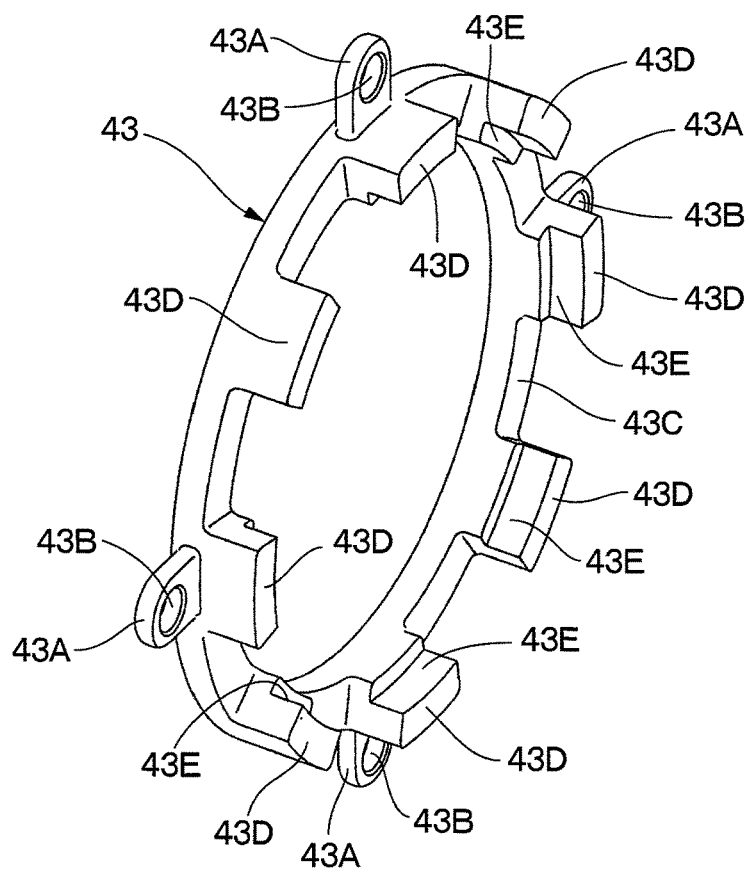
FIG. 13 is a perspective view illustrating a pressure ring as a unit.

The pressure ring 43 is disposed between the pressing plate 40 and the piston 46. The pressure ring 43 is pressed by the piston 46 to axially move and presses the rotating discs 38 toward the non-rotating discs 39 via the pressing plate 40. As illustrated in FIG. 4 and FIG. 13, the pressure ring 43 is formed as an annular body having an outer diameter dimension smaller in diameter than the collar part 27B of the third case 27. Four projecting parts 43A are arranged on the outer peripheral side of the pressure ring 43 to project to the radial outward at angular intervals of 90 degrees. Pin insert holes 43B are respectively formed in the four projecting parts 43A. The pin insert holes 43B correspond to the screw holes 27E formed in the collar part 27B of the third case 27.

A plurality of (for example, eight) rectangular projections 43D are arranged to project on an end surface 43C, which axially faces the third case 27, of the pressure ring 43, the rectangular projections 43D being arranged in positions corresponding to the rectangular holes 27F of the third case 27. The rectangular projections 43D are respectively inserted in the rectangular holes 27F of the third case 27, and the front ends of the rectangular projections 43D abut on the pressing plate 40. By notching an inner peripheral surface of each of the rectangular projections 43D from the front end toward the end surface 43C, a stepped lever member accommodating recessed part 43E is formed on the inner peripheral side of the rectangular projection 43D. The lever member 53 is accommodated in the lever member accommodating recessed part 43E (refer to FIG. 5).

Four pins 44 are respectively arranged in the collar part 27B of the third case 27. The pin 44 has a screw part 44A, and this screw part 44A is threaded in the screw hole 27E of the collar part 27B. The pin 44 projects axially from the collar part 27B toward the right retainer 41 and is inserted in the pin insert hole 43B disposed in the projecting part 43A of the pressure ring 43. A stop ring 45 is attached on the outer periphery of the pin 44. Accordingly, the pressure ring 43 axially moves while being guided by the pin 44 and is prevented from being axially pulled out by the stop ring 45.

Figure 14:
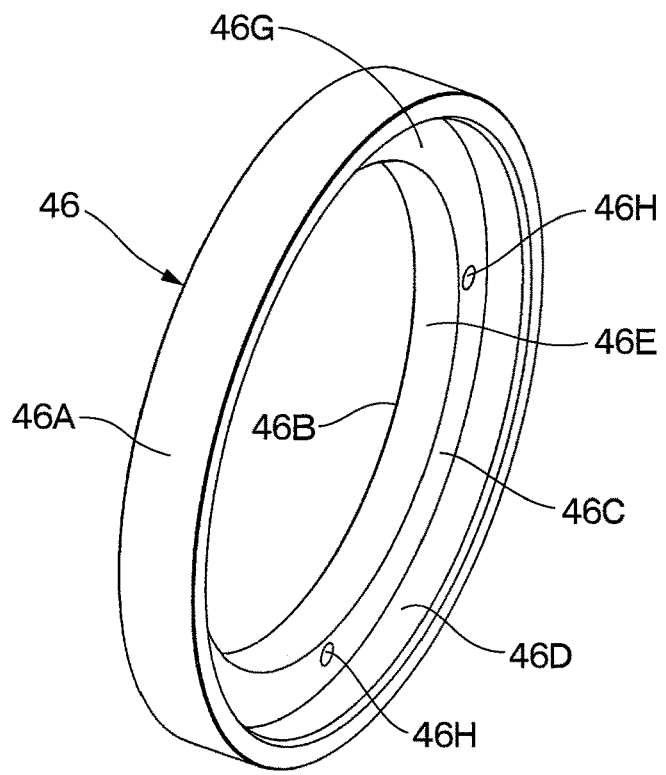
FIG. 14 is a perspective view illustrating the piston as viewed from a large-diameter cylindrical body-side.
Figure 15:
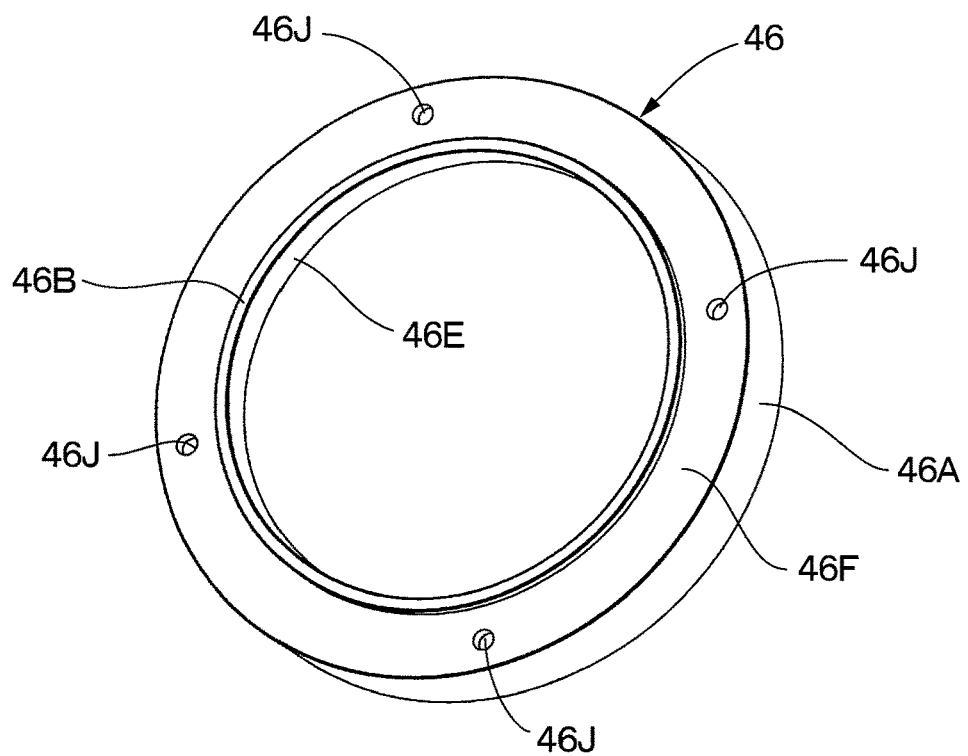
FIG. 15 is a perspective view illustrating the piston as viewed from a small-diameter cylindrical body-side.

The piston 46 as an actuator is disposed in the piston accommodating part 41D of the right retainer 41. As illustrated in FIG. 14 and FIG. 15, the piston 46 is formed in a stepped cylindrical shape and is composed of a large-diameter cylindrical body 46A and a small-diameter cylindrical body 46B. An inner-diameter projected part 46C in an annular shape is disposed on an inner peripheral side of a boundary part between the large-diameter cylindrical body 46A and the small-diameter cylindrical body 46B to extend to the radial inward. An outer diameter dimension of the large-diameter cylindrical body 46A is set to be equal to that of the cylindrical body 41A of the right retainer 41, and an inner peripheral surface 46D of the large-diameter cylindrical body 46A is slidably fitted on an outer peripheral surface of the large-diameter step part 41E of the right retainer 41. An inner peripheral surface 46E of the inner-diameter projected part 46C is slidably fitted on an outer peripheral surface of the small-diameter step part 41F of the right retainer 41.

In this way, the right retainer 41 is provided with the piston accommodating part 41D that is smaller in an outer diameter dimension than the cylindrical body 41A and is composed of the large-diameter step part 41E and the small-diameter step part 41F, and the piston 46 is attached in the piston accommodating part 41D of the right retainer 41. As a result, the outer diameter dimension of the large-diameter cylindrical body 46A of the piston 46 is equal to the cylindrical body 41A of the right retainer 41. Accordingly, the piston 46 can be inserted in the through hole 14D formed in the right partition wall 14C of the differential body 14 in a state of the piston 46 being incorporated in the piston accommodating part 41D of the right retainer 41. In this state, by fixing the right retainer 41 on the right partition wall 14C, the piston 46 can be caused to abut on the pressure ring 43 via a later-described thrust bearing 49.

An end surface, which is in the small-diameter cylindrical body 46B-side, of the inner-diameter projected part 46C of the piston 46 is formed as an annular pressing surface 46F. The pressing surface 46F presses the end surface of the pressure ring 43 to apply a load thereon. An end surface 46G, which is at the opposite side to the pressing surface 46F (in the large-diameter cylindrical body 46A-side), of the inner-diameter projected part 46C abuts on an end surface 41J of the right retainer 41. An annular hydraulic chamber 47 is formed between the end surface 46G of the piston 46 and the entire peripheral groove 41K formed on the end surface 41J in the right retainer 41 (the piston accommodating part 41D) over an entire periphery thereof. Accordingly, when the hydraulic oil is supplied to the hydraulic chamber 47, the piston 46 axially moves to apply a load on the pressure ring 43.

Four pin holes 46H are formed on the end surface 46G of the piston 46 at angular intervals of 90 degrees. The pin holes 46H correspond to the pin holes 41L formed on the entire peripheral groove 41K of the right retainer 41. One end of a pin 48 is fitted in the pin hole 41L of the right retainer 41 and the other end of the pin 48 is fitted in the pin hole 46H of the piston 46. Thereby, the piston 46 is axially movable in a state of being prevented from rotating relative to the piston accommodating part 41D in the right retainer 41. On the other hand, four pin holes 46J are formed on the pressing surface 46F of the piston 46 at angular intervals of 90 degrees.

An annular thrust bearing 49 is disposed between the pressing surface 46F of the piston 46 and the pressure ring 43. Four pins 50 are inserted in the thrust bearing 49 and the pins 50 are fitted in the pin holes 46J of the piston 46. Thereby, the thrust bearing 49 is radially positioned to the piston 46 and is prevented from rotating relative to the piston 46. Accordingly, the piston 46 can press the pressure ring 43 via the thrust bearing 49, thus suppressing the friction from being generated between the piston 46 and the pressure ring 43.

An oil passage 51 is formed in the right partition wall 14C of the differential body 14 and in the right retainer 41 to perform supply and discharge of hydraulic oil (liquid pressure) to and from the hydraulic chamber 47. The oil passage 51 is composed of a partition wall-side oil passage 51A formed in the right partition wall 14C and a retainer-side oil passage 51B formed in the right retainer 41. A flow inlet of the oil passage 51 (partition wall-side oil passage 51A) opens to the outer peripheral surface of the differential body 14. A flow outlet of the oil passage 51 (retainer-side oil passage 51B) opens to the entire peripheral groove 41K formed on the end surface 41J of the piston accommodating part 41D of the right retainer 41. A hydraulic source (not shown) is connected to the flow inlet of the partition wall-side oil passage 51A. The hydraulic oil discharged from the hydraulic source is supplied via the partition wall-side oil passage 51A and the retainer-side oil passage 51B to the hydraulic chamber 47.

Figure 12:
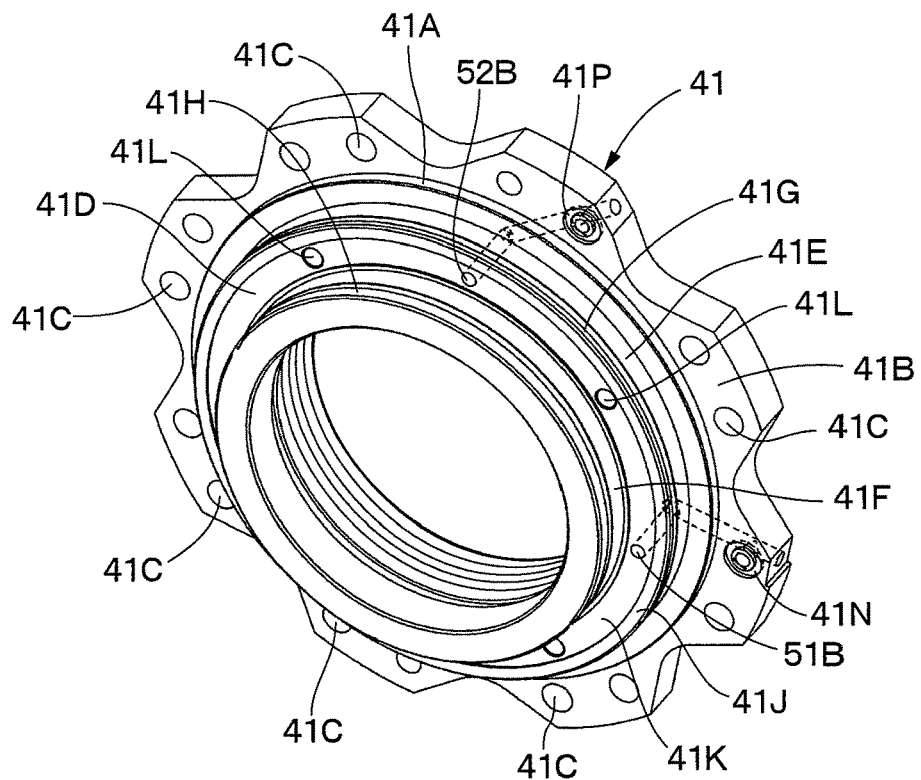
FIG. 12 is a perspective view illustrating a right retainer as a unit.

An annular seal attaching groove 41N is formed on an end surface, which abuts on the right partition wall 14C of the differential body 14, of the collar part 41B of the right retainer 41 to surround the retainer-side oil passage 51B (refer to FIG. 12). An O-ring 51C is attached in the seal attaching groove 41N to surround a connection part between the partition wall-side oil passage 51A and the retainer-side oil passage 51B, and the connection part between the partition wall-side oil passage 51A and the retainer-side oil passage 51B is sealed in a liquid-tight manner by O-ring 51C.

Figure 18:
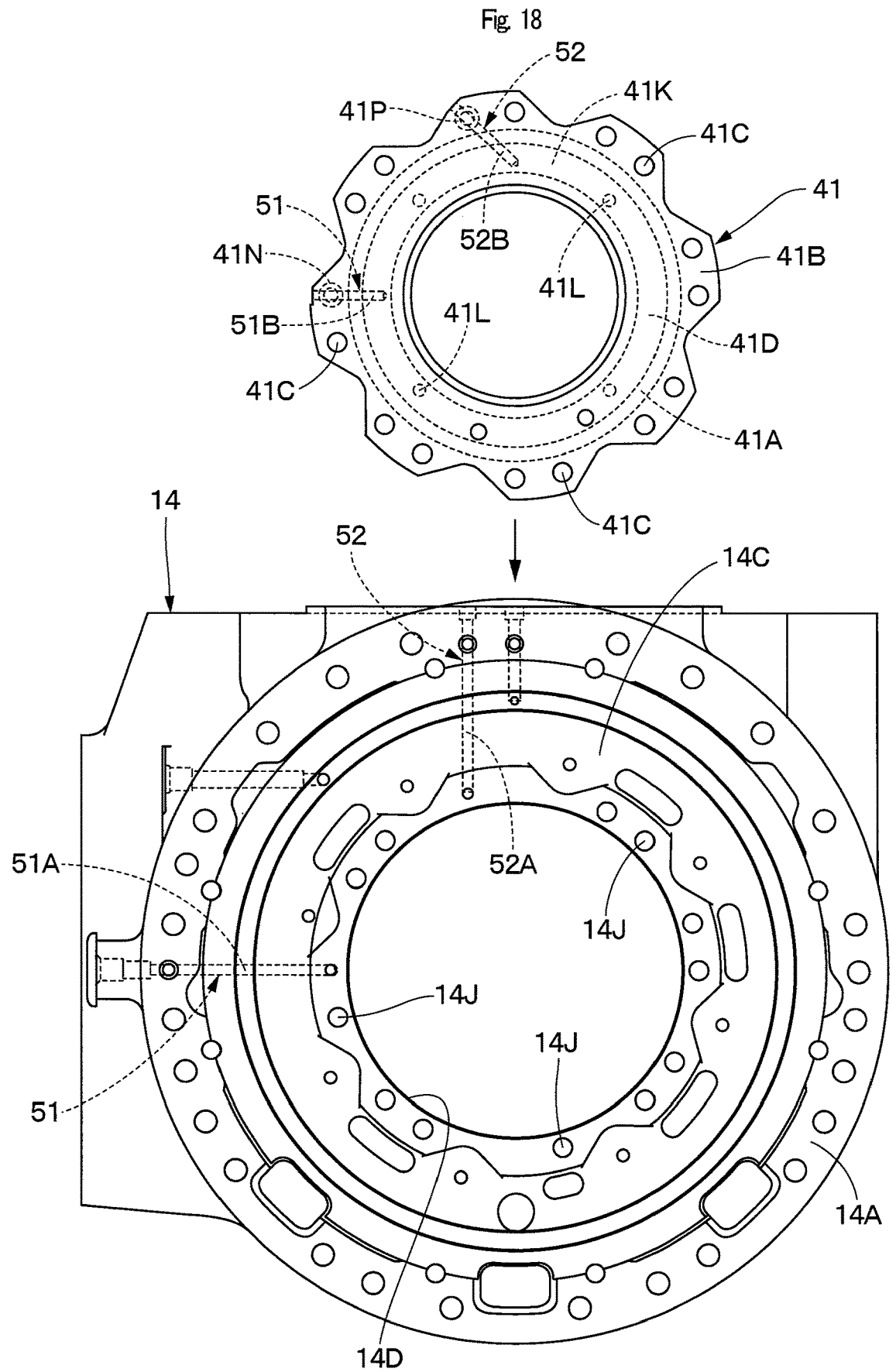
FIG. 18 is a right side view illustrating a state of attaching the right retainer to a right partition wall of a differential body.

An air-bleeding passage 52 is formed in the right partition wall 14C of the differential body 14 and in the right retainer 41. The air-bleeding passage 52 is, at the time of incorporating the piston 46 to the piston accommodating part 41D of the right retainer 41, a passage for discharging air in the hydraulic chamber 47 to an exterior. As illustrated in FIG. 18, the air-bleeding passage 52 is configured of a partition wall-side passage 52A formed in the right partition wall 14C and a retainer-side passage 52B formed in the right retainer 41. One end of the air-bleeding passage 52 (retainer-side passage 52B) opens to the bottom part of the entire peripheral groove 41K formed in the piston accommodating part 41D of the right retainer 41. The other end of the air-bleeding passage 52 (partition wall-side passage 52A) opens to the outer peripheral surface of the differential body 14. Thereby, when the piston 46 is installed in the piston accommodating part 41D of the right retainer 41, the air in the hydraulic chamber 47 is discharged through the retainer-side passage 52B and the partition wall-side passage 52A to an exterior. Accordingly, the piston 46 can smoothly be installed in the piston accommodating part 41D.

An annular seal attaching groove 41P is formed on an end surface, which abuts on the right partition wall 14C of the differential body 14, of the collar part 41B of the right retainer 41 to surround the retainer-side passage 52B. An O-ring (not shown) is attached in the seal attaching groove 41P to surround a connection part between the partition wall-side passage 52A and the retainer-side passage 52B, and the connection part between the partition wall-side passage 52A and the retainer-side passage 52B is sealed in an air-tight manner by this O-ring. In addition, after incorporating the piston 46, the other end of the partition wall-side 52A is closed by a sealing plug (not shown).

Next, an explanation will be made of the lever member 53 to be used in the present embodiment.

Figure 5:
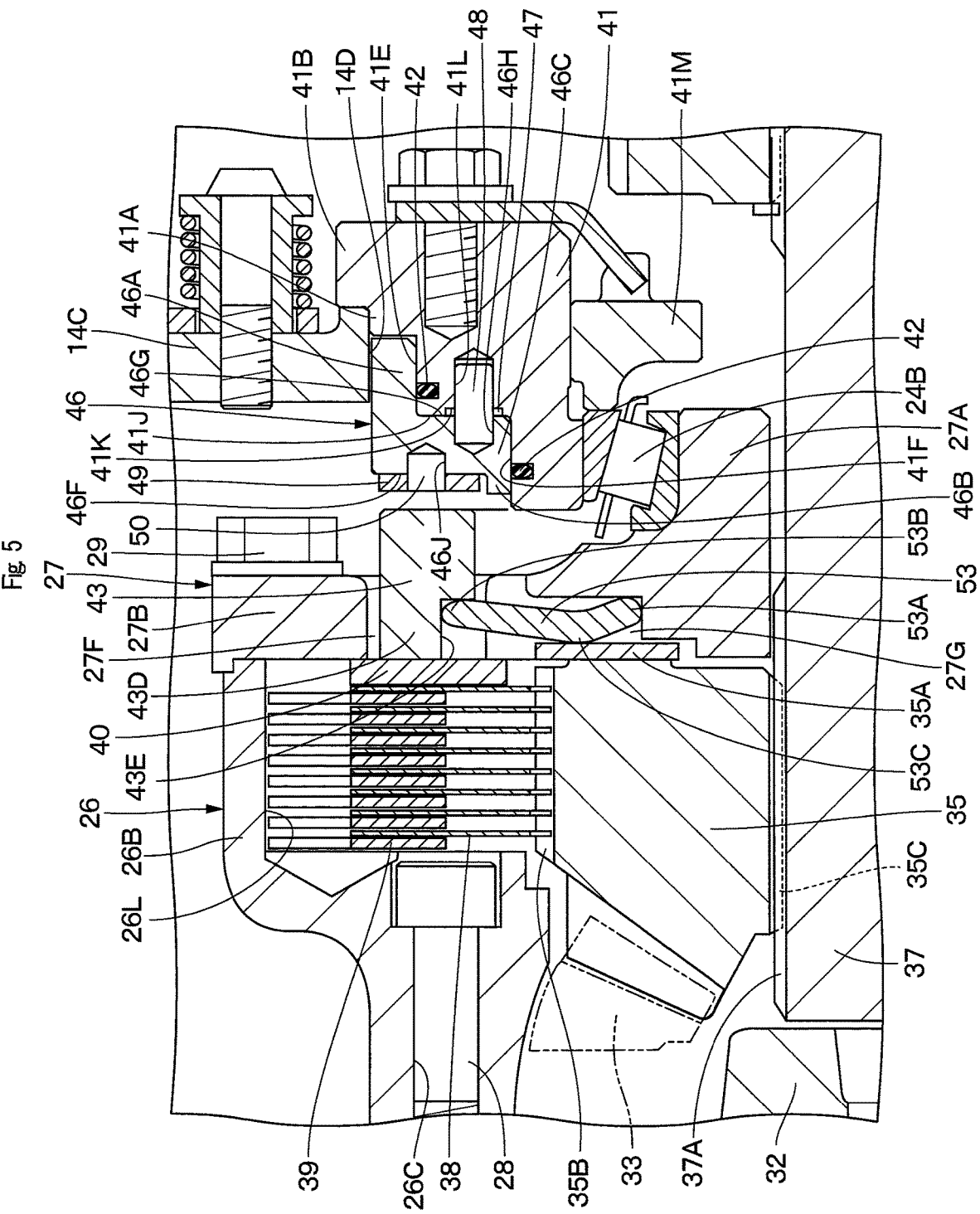
FIG. 5 is a cross section illustrating an essential part of a third case, a right side gear, a pressure ring, a piston, a lever member and the like in FIG. 4 in an enlarging manner.
Figure 16:
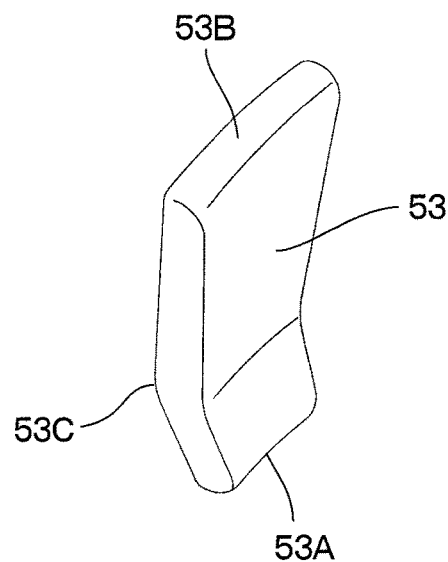
FIG. 16 is a perspective view illustrating a lever member as a unit.
Figure 17:
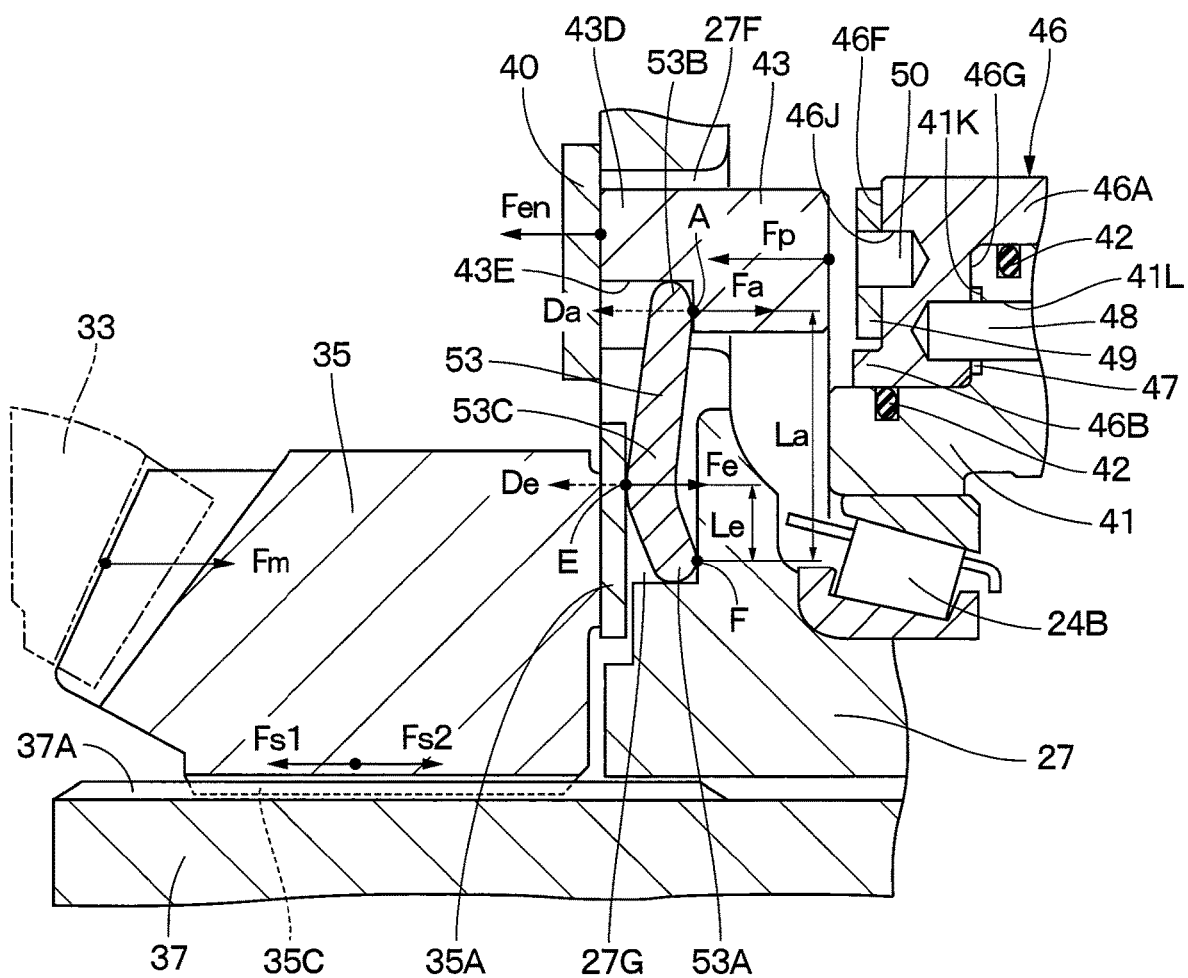
FIG. 17 is a cross section illustrating loads acting on the right side gear, the lever member, the pressure ring and the like by an engaging reaction force between the right side gear and the pinion gear.

The plurality of (for example, four) lever members 53 are arranged between the third case 27 of the differential case 23, the right side gear 35 and the pressure ring 43. As illustrated in FIG. 16, the lever member 53 is formed as a trapezoidal plate body, having one end part 53A narrow in width in the longitudinal direction and the other end part 53B wide in width in the longitudinal direction. The lever member 53 has an intermediate part in the longitudinal direction that is bent in a chevron and an intermediate part 53C in the longitudinal direction that is a convex part corresponding to the bending shape. As illustrated in FIG. 5 and FIG. 17, the four lever members 53 are accommodated in a Lever member accommodating groove 27G of the third case 27 and in a lever member accommodating recessed part 43E of the pressure ring 43 in a state of incorporating a rectangular projection 43D of the pressure ring 43 in the rectangular hole 27F of the third case 27.

In this state, the one end part 53A of the lever member 53 abuts on (contacts) the Lever member accommodating groove 27G, and the other end part 53B of the lever member 53 abuts on (contacts) the lever member accommodating recessed part 43E. In addition, the intermediate part 53C of the lever member 53 abuts on (contacts) a thrust plate 35A of the right side gear 35. As illustrated in FIG. 17, the one end part 53A of the lever member 53 has a portion that abuts on (contacts) the Lever member accommodating groove 27G, that portion being defined as a first abutting part F, which configures a fulcrum point of the lever member 53. The intermediate part 53C of the lever member 53 has a portion that abuts on (contacts) the thrust plate 35A, that portion being defined as a second abutting part E, which configures the point of force of the lever member 53. The other end part 53B of the lever member 53 has a portion that abuts on (contacts) the lever member accommodating recessed part 43E, that portion being defined as a third abutting part A, which configures the point of action of the lever member 53. Here, a distance between the first abutting part F and the second abutting part E in a direction perpendicular to the axis X-X is indicated by Le. On the other hand, a distance between the first abutting part F and the third abutting part A in a direction perpendicular to the axis X-X is indicated by La, and distance La is larger than distance Le (La>Le). The second abutting part E and the third abutting part A of the lever member 53 are movable in the axis X-X direction on a basis of the first abutting part F.

The piston 46 is, by supplying hydraulic oil to the hydraulic chamber 47, caused to press the pressure ring 43 to the pressing plate 40-side with a load Fp in accordance with a pressure of the hydraulic oil. On the other hand, a load Fm to the piston 46-side acts on the right side gear 35 by a reaction force (engaging reaction force) due to the engagement between the right side gear 35 and the pinion gear 33. Thereby, a load Fe to the piston 46-side acts on the second abutting part E of the lever member 53. When the right side gear 35 axially moves along the right transmission shaft 37, a frictional force Fs1 or Fs2 is generated between the hole spline part 35C and the shaft spline part 37A of the right transmission shaft 37. Accordingly, the load Fe acting on the second abutting part E of the lever member 53 changes in accordance with a direction of the frictional force, that is, whether the frictional force is Fs1 or Fs2.

The load Fe acting on the second abutting part E of the lever member 53 generates a load Fa to the piston 46-side to the third abutting part A of the lever member 53 (other end part 53B). This load Fa is a load to which the load Fe is converted at a ratio in accordance with the distance Le between the first abutting part F and the second abutting part E of the lever member 53 and the distance La between the first abutting part F and the third abutting part A of the lever member 53. In addition, the load Fa acts in the opposing direction to the load Fp acting on the pressure ring 43 from the piston 46. Accordingly, a load Fen by which the pressure ring 43 (rectangular projection 43D) presses the rotating disc 38 via the pressing plate 40 is lowered by the load Fa acting on the third abutting part A of the lever member 53 to the load Fp acting on the pressure ring 43 from the piston 46. That is, the lever member 53 transmits the engaging reaction force between the right side gear 35 and the pinion gear 33 to the pressure ring 43 to control a load to be applied to the pressure ring 43 from the piston 46.

Here, in a case where the load Fp acting on the pressure ring 43 from the piston 46 is larger than the load Fa acting on the third abutting part A of the lever member 53, the pressure ring 43 is displaced to the pressing plate 40-side. At this time, the third abutting part A of the lever member 53 is displaced to the pressing plate 40-side by a displacement quantity Da, and the second abutting part E of the lever member 53 is also displaced to the pressing plate 40-side by a displacement quantity De. This displacement quantity De is a displacement quantity to which the displacement quantity Da is converted at a ratio in accordance with the distance Le between the first abutting part F and the second abutting part E of the lever member 53 and the distance La between the first abutting part F and the third abutting part A. As a result, the right side gear 35 is pressed on the second abutting part E of the lever member 53 to be displaced to the pinion gear 33-side by the displacement quantity De.

On the other hand, when the supply of the hydraulic oil to the hydraulic chamber 47 is stopped, the second abutting part E of the lever member 53 is displaced to the piston 46-side by the load Fm acting on the right side gear 35. Thereby, the second abutting part E of the lever member 53 is displaced to the piston 46-side by the displacement quantity De, and the right side gear 35 is also displaced to the piston 46-side by the displacement quantity De. Thereby, the third abutting part A of the lever member 53 is displaced to the piston 46-side by the displacement quantity Da following the displacement of the second abutting part E of the lever member 53. In this way, the right side gear 35 is repeatedly displaced axially depending upon the engaging reaction force with the pinion gear 33 and the load applied from the piston 46.

In a case where the hydraulic oil is supplied to the hydraulic chamber 47 and the load Fp acts on the pressure ring 43 from the piston 46, the load Fen acts on the pressing plate 40 from the pressure ring 43 (rectangular projection 43D). Thereby, the rotating discs 38 and the non-rotating discs 39 are pressed by the pressing plate 40 to cause frictional contact between the second case 26 and the piston 46. Thereby, in a case where the torque difference between the left axle shaft 19L and the right axle shaft 19R is equal to or less than the torque capacity transmissive by the frictional contact between the rotating discs 38 and the non-rotating discs 39, the differential mechanism 20 becomes in the locking state. Accordingly, the left side gear 34 and the right side gear 35 rotate integrally with the differential case 23, and the torque is transmitted to the left axle shaft 19L and the right axle shaft 19R respectively.

On the other hand, in a case where the supply of the hydraulic oil to the hydraulic chamber 47 is stopped, the load Fp acting on the pressure ring 43 from the piston 46 is zero. In a case where the drive torque is applied to the input shaft 17 in this state, the load Fm by the engaging reaction force with the pinion gear 33 acts on the right side gear 35. The load Fm is designed to be larger than the frictional force Fs1 or Fs2 between the right transmission shaft 37 and the right side gear 35. Therefore, the load Fe to the piston 46-side acts on the second abutting part E of the lever member 53 from the thrust plate 35A, and the load Fa to the piston 46-side acts on the pressure ring 43 from the third abutting part A of the lever member 53. Thereby, the piston 46 moves in a direction away from the pressing plate 40 to release the frictional contact between the rotating discs 38 and the non-rotating discs 39. Accordingly, the right side gear 35 is caused to be rotatable relative to the differential case 23, and a rotating force of the engine 7 is distributed to the left front wheel 5 and the right front wheel 5 according to a difference in frictional force between the left and right front wheels 5 and the ground road surface.

Here, a lever ratio iL of the lever member 53 is defined according to the following Formula 1 by the distance La from the first abutting part F to the third abutting part A of the lever member 53 and the distance Le from the first abutting part F to the second abutting part E of the lever member 53. This lever ratio iL is uniquely determined by a shape of the lever member 53. It is possible to change a load and a displacement quantity of each of the second abutting part E and the third abutting part A in accordance with this lever ratio iL.

$$iL = \frac{La}{Le} \qquad \text{[Formula 1]}$$

The one end part 53A of the lever member 53 abuts on the third case 27 in the first abutting part F. The other end part 53B of the lever member 53 abuts on the pressure ring 43 in the third abutting part A. The intermediate part 53C of the lever member 53 abuts on the thrust plate 35A of the right side gear 35 in the second abutting part E. Therefore, the load Fe acting on the second abutting part E of the lever member 53 is calculated as a combined force of the load Fm and the frictional force Fs1 or Fs2.

In a case where the drive torque is generated after the hydraulic oil is supplied to the hydraulic chamber 47 in a state where the drive torque of the input shaft 17 is zero (hereinafter, referred to as a case of Condition 1), since the frictional force is the frictional force Fs1 in the opposing direction to the load Fm, the load Fe is calculated according to the following Formula 2.

$$Fe=Fm-Fs1 \qquad \text{[Formula 2]}$$

On the other hand, in a case where the drive torque rises by the supply of the hydraulic oil to the hydraulic chamber 47 in a state where the drive torque of the input shaft 17 is generated (hereinafter, referred to as a case of Condition 2), since the frictional force is the frictional force Fs2 in the same direction as the load Fm, the load Fe is calculated according to the following Formula 3.

$$Fe=Fm+Fs2 \qquad \text{[Formula 3]}$$

At this time, the load Fa acting on the pressure ring 43 from the third abutting part A of the lever member 53 is calculated according to the following Formula 4 based upon the lever ratio iL of the lever member 53 and the load Fe.

$$Fa = \frac{1}{iL} \times Fe \qquad \text{[Formula 4]}$$

The load Fen by which the pressure ring 43 presses the rotating discs 38 via the pressing plate 40 is calculated according to the following formula 5 based upon the load Fp acting on the pressure ring 43 from the piston 46 and the load Fa acting on the pressure ring 43 from the third abutting part A of the lever member 53.

$$Fen=Fp-Fa \qquad \text{[Formula 5]}$$

When the load Fen acts on the pressing plate 40 from the pressure ring 43, the displacement quantity De by which the second abutting part E of the lever member 53 is displaced in the axis X-X direction is calculated according to the following Formula 6 based upon the displacement quantity Da of the third abutting part A of the lever member 53 and the lever ratio iL of the lever member 53.

$$De = \frac{1}{iL} \times Da \qquad \text{[Formula 6]}$$

The left planetary gear reduction mechanism 54L is disposed in the reduction gear room 15B of the left axle tube 15L (refer to FIG. 3). The planetary gear reduction mechanism 54L is configured of the sun gear 36A formed integrally with the front end side of the left transmission shaft 36, a ring gear 55, a plurality of planet gears 56 and a carrier 57. The ring gear 55 is disposed on an inner peripheral side of the left axle tube 15L (cylindrical body 15A). The plurality of planet gears 56 are rotatable by the carrier 57 and are engaged with the sun gear 36A and the ring gear 55. The carrier 57 is spline coupled to the left axle shaft 19L. Accordingly, the rotation of the left transmission shaft 36 is transmitted to the left axle shaft 19L in a state of being reduced in speed by the planetary gear reduction mechanism 54L.

The right planetary gear reduction mechanism 54R is disposed in the reduction gear room 15B of the right axle tube 15R. The planetary gear reduction mechanism 54R is configured of, as similar to the left planetary gear reduction mechanism 54L, the sun gear 37B formed integrally with the front end side of the right transmission shaft 37, the ring gear 55, the plurality of planet gears 56 and the carrier 57. The carrier 57 is spline coupled to the right axle shaft 19R. Accordingly, the rotation of the right transmission shaft 37 is transmitted to the right axle shaft 19R in a state of being reduced in speed by the planetary gear reduction mechanism 54R.

The left brake mechanism 58L is disposed in the left brake room 14F of the differential body 14. This brake mechanism 58L is configured as a wet type multiple-brake mechanism, for example. As illustrated in FIG. 4, the brake mechanism 58L includes a plurality of brake discs 60 spline coupled via a hub 59 on an outer peripheral side of the left transmission shaft 36, a brake plate 61, and a brake piston 62. The brake discs 60 rotate together with the left transmission shaft 36. The brake plate 61 is disposed to face the brake discs 60 and is held in a non-rotating state relative to the differential body 14. In addition, the brake piston 62 pushes the brake plate 61 against the brake discs 60 by the hydraulic force from an exterior. Thereby, the braking force is applied to the left transmission shaft 36.

The right brake mechanism 58R is disposed in the right brake room 14G of the differential body 14. The brake mechanism 58R is configured of, as similar to the left brake mechanism 58L, a plurality of brake discs 60 spline coupled via a hub 59 on an outer peripheral side of the right transmission shaft 37, a brake plate 61, and a brake piston 62. In addition, the brake piston 62 pushes the brake plate 61 against the brake discs 60 by the hydraulic force from an exterior. Thereby, the braking force is applied to the right transmission shaft 37.

The front axle device 12 according to the present embodiment has the configuration as described above, and hereinafter, an explanation will be made of the operation of the front axle device 12 at the traveling of the wheel loader 1.

When an operator who has got in the cab 10 operates the engine 7, a rotational force of the engine 7 is transmitted to the input shaft 17 through the propeller shaft 9B of the transmission 9. The rotation of the input shaft 17 is transmitted from the drive pinion 17B to the ring gear 30 of the differential mechanism 20 to rotate the differential case 23 to which the ring gear 30 is attached.

The four Shafts 32A of the spider 32 are tightly held between the recessed part 25H of the first case 25 and the recessed part 26E of the second case 26 configuring part of the differential case 23. Accordingly, the spider 32 rotates together with the differential case 23 in a state where the four pinion gears 33 are respectively supported by the four Shafts 32A.

In a case where the supply of the hydraulic oil to the hydraulic chamber 47 is stopped, the load Fp to be applied to the pressure ring 43 from the piston 46 is zero. In a case where the drive torque is applied to the input shaft 17 in this state, the load Fm to the piston 46-side acts on the right side gear 35 due to the engaging reaction force between the pinion gear 33 and the right side gear 35. The load Fm is designed to be larger than the frictional force Fs1 or Fs2 between the right transmission shaft 37 and the right side gear 35. Therefore, the load Fe to the piston 46-side acts on the second abutting part E of the lever member 53 from the thrust plate 35A, and the load Fa to the piston 46-side acts on the pressure ring 43 from the third abutting part A of the lever member 53. Thereby, the piston 46 moves in a direction away from the pressing plate 40 to hold the rotating discs 38 and the non-rotating discs 39 to be in a non-contact state from each other.

Accordingly, when the differential case 23 rotates together with the pinion gears 33, the left side gear 34 and the right side gear 35 also engaged with the pinion gears 33 rotate. The rotation of the left transmission shaft 36 spline coupled to the left side gear 34 is transmitted to the left axle shaft 19L in a state of being reduced in speed by the planetary gear reduction mechanism 54L. Similarly, the rotation of the right transmission shaft 37 spline coupled to the right side gear 35 is transmitted to the right axle shaft 19R in a state of being reduced in speed by the planetary gear reduction mechanism 54R. As a result, the left and right front wheels 5 are driven and rotated simultaneously.

In a case where a frictional force between the left front wheel 5 and the ground road surface is equal to that between the right front wheel 5 and the ground road surface at the straight-traveling of the wheel loader 1, the left side gear 34 and the right side gear 35 rotate together with the differential case 23. As a result, the rotational force of the engine 7 is transmitted to the left and right front wheels 5 on an equal basis, making it possible to cause the wheel loader 1 to travel straight. On the other hand, in a case where the frictional force between the left front wheel 5 and the ground road surface differs from that between the right front wheel 5 and the ground road surface at the revolving travel of the wheel loader 1, the left side gear 34 and the right side gear 35 rotate in rotating speeds different from each other. As a result, the rotational force of the engine 7 is distributed to the left front wheel 5 and the right front wheel 5 in accordance with a difference in the frictional force between the left front wheel 5 and the ground road surface and between the right front wheel 5 and the ground road surface, and therefore, the wheel loader 1 can revolving-travel.

Here, at the traveling or the like of the wheel loader 1 in a case where a ground road surface state of the left front wheel 5 differs from a ground road surface state of the right front wheel 5, it is required to avoid one of the left and right front wheels 5 from possibly running idle due to the differential mechanism 20.

In this case, for example, by operations to a foot pedal, a manual switch and the like (none of them is illustrated) arranged in the cab 10 or by a calculation device that actually measures or predicts idle running of the left and right front wheels 5, the differential limit of the differential mechanism 20 is carried out. That is, the hydraulic oil from the hydraulic source is supplied through the partition wall-side oil passage 51A and the retainer-side oil passage 51B to the hydraulic chamber 47.

In the present embodiment, characteristics for limiting the differential differ between a case where the drive torque is generated after the hydraulic oil is supplied to the hydraulic chamber 47 in a state (stopping state) where the drive torque of the input shaft 17 is zero (case of Condition 1) and a case where the drive torque rises by the supply of the hydraulic oil to the hydraulic chamber 47 in a state (travelling state) where the drive torque of the input shaft 17 is generated (case of Condition 2).

In a case of Condition 1, the load Fm acting on the right side gear 35 is zero and the frictional force Fs1 between the right side gear 35 and the right transmission shaft 37 is zero. In this state, the load Fp acts on the pressure ring 43 from the piston 46 by the hydraulic oil supplied to the hydraulic chamber 47 in this state. The load Fen acting on the pressing plate 40 from the pressure ring 43 is larger than zero according to the above-described Formula 2, Formula 4 and Formula 5 (Fen>0). Accordingly, the pressure ring 43 presses the pressing plate 40 by the thrust force of the piston 46. Thereby, the rotating discs 38 and the non-rotating discs 39 are brought into frictional contact to generate clutch transmission torque in accordance with the load Fen between the rotating discs 38 and the non-rotating discs 39.

At this time, the third abutting part A abutting on the pressure ring 43 out of the lever member 53 and the second abutting part E abutting on the thrust plate 35A of the right side gear 35 are displaced to the pinion gear 33-side. The relation of the above-described Formula 6 is established between the displacement quantity (that is, the displacement quantity of the pressure ring 43) Da of the third abutting part A of the lever member 53 and the displacement quantity (that is, the displacement quantity of the right side gear 35) De of the second abutting part E of the lever member 53. In this way, by the supply of the hydraulic oil to the hydraulic chamber 47 in a state where the drive torque is zero, the right side gear 35 is displaced to the pinion gear 33-side by the displacement quantity De.

Next, in a case where the drive torque of the input shaft 17 is generated in a state where the right side gear 35 is displaced to the pinion gear 33-side (case where the wheel loader 1 travels), the load Fm by the engaging reaction force with the pinion gear 33 acts on the right side gear 35. This load Fm is proportional to the drive torque. In addition, since the right side gear 35 is caused to be displaced to the piston 46-side by the load Fm, the frictional force Fs1 in the opposing direction to the load Fm acts between the right side gear 35 and the right transmission shaft 37. Therefore, the load Fe acting on the second abutting part E of the lever member 53 is calculated according to the above-described Formula 2.

Here, the load Fm is designed to be larger than the frictional force Fs1 (Fm>Fs1) and has a proportional relation to the drive torque. In addition, the load Fp acting on the pressure ring 43 from the piston 46 is always a constant value. As a result, the load Fe acting on the second abutting part E of the lever member 53 from the right side gear 35 (thrust plate 35A) is proportional to the drive torque and the load Fen acting on the pressing plate 40 from the pressure ring 43 is inversely proportional to the drive torque. The clutch transmission torque to be generated between the rotating discs 38 and the non-rotating discs 39 is generated according to the load Fen. Accordingly, the torque capacity (value found by multiplying the clutch transmission torque by a reduction ratio of the left and right planetary gear reduction mechanism 54L, 54R respectively) is lowered following the rise of the drive torque.

On the other hand, in a case of Condition 2, the load Fp from the piston 46 acts on the pressure ring 43 in a state where the right side gear 35 is positioned on the piston 46-side by the load Fm due to the engaging reaction force with the pinion gear 33. Thereby, the right side gear 35 is caused to be pressed by the pressure ring 43 to be displaced to the pinion gear 33-side. At this time, the frictional force Fs2 in the same direction as the load Fm acts between the right side gear 35 and the right transmission shaft 37. Therefore, the load Fe acting on the second abutting part E of the lever member 53 from the right side gear 35 is calculated according to the above-described Formula 3.

Here, the load Fm is designed to be larger than the frictional force Fs2 (Fm>Fs2) and has a proportional relation to the drive torque. As a result, the load Fe is proportional to the drive torque and the load Fen is inversely proportional to the drive torque. The clutch transmission torque to be generated between the rotating discs 38 and the non-rotating discs 39 is generated according to the load Fen. Accordingly, the torque capacity is lowered following the rise of the drive torque.

In this way, in a case of Condition 1, the direction of the load Fm is inverse to the direction of the frictional force Fs1. As a result, the clutch transmission torque is lowered gradually (obtusely) relative to the rise of the drive torque. On the other hand, in a case of Condition 2, the direction of the load Fm is in the same direction as that of the frictional force Fs2. As a result, the clutch transmission torque is lowered quickly (keenly) relative to the rise of the drive torque.

Figure 19:
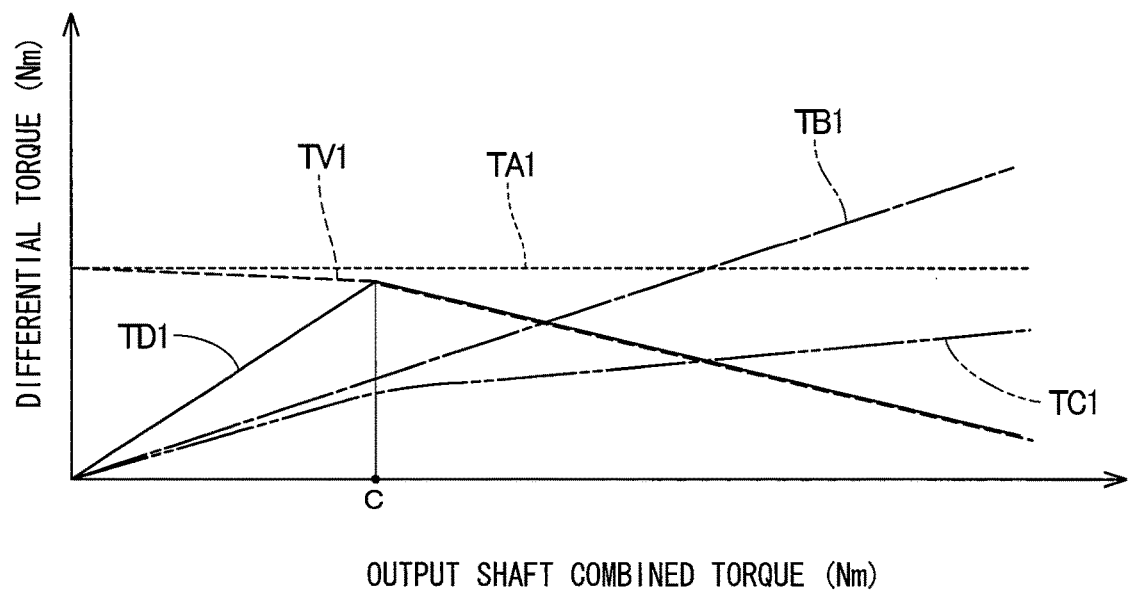
FIG. 19 is a characteristic diagram illustrating a relation between differential torque and output shaft combined torque in a case of Condition 1.

FIG. 19 illustrates a relation between differential torque and output shaft combined torque in a case of Condition 1. The differential torque is a torque difference between the left axle shaft 19L and the right axle shaft 19R. The output shaft combined torque is a combined value of torque of the left axle shaft 19L and the right axle shaft 19R. In FIG. 19, a characteristic line of a short broken line shows differential torque TA1 by the load Fp, a characteristic line of a dashed-dotted line shows differential torque TB1 by the load Fm. In addition, a characteristic line of a dashed-two dotted line shows differential torque TC1 by the frictional force Fs1, and a characteristic line of a solid line shows differential torque TD1. In addition, C point in FIG. 19 shows a point where the maximum torque capacity to be transmitted by the rotating discs 38 and the non-rotating discs 39 becomes equal to the output shaft combined torque. In a case of Condition 1, the load Fm is a load in the inverse direction to the load Fp and the frictional force Fs1 is a load in the same direction as the load Fp. Therefore, the torque capacity TV1 by the rotating discs 38 and the non-rotating discs 39 is calculated according to the following Formula 7 and is represented by a characteristic line of a long broken line.

$$TV1 = TA1 - TB1 + TC1 \qquad \text{[Formula 7]}$$

The differential torque TA1 by the load Fp is maintained as a constant value over the entire region since the hydraulic pressure to be supplied to the hydraulic chamber 47 is constant. The differential torque TB1 by the load Fm increases together with the rise of the output shaft combined torque since the load Fm is proportional to the output shaft combined torque. The differential torque TC1 by the frictional torque Fs1 has a large inclination since the rise of the differential torque is steep until C point and a smaller inclination according to the differential torque being lowered over C point. On the other hand, the differential torque TD1 holds a relation of the differential torque TD1=(output shaft combined torque) since (torque capacity)>(output shaft combined torque) in a region where the output shaft combined torque is below C point. In a region where the output shaft combined torque is over C point, a relation of (torque capacity)<(output shaft combined torque) is established, causing the rotating discs 38 and the non-rotating discs 39 to start to slide with each other. Therefore, a relation of the differential torque TD1=(torque capacity) is established. That is, since the load Fm increases following the rise of the output shaft combined torque after C point, the torque capacity TV1 is lowered and the differential torque TD1 is also lowered.

Figure 20:
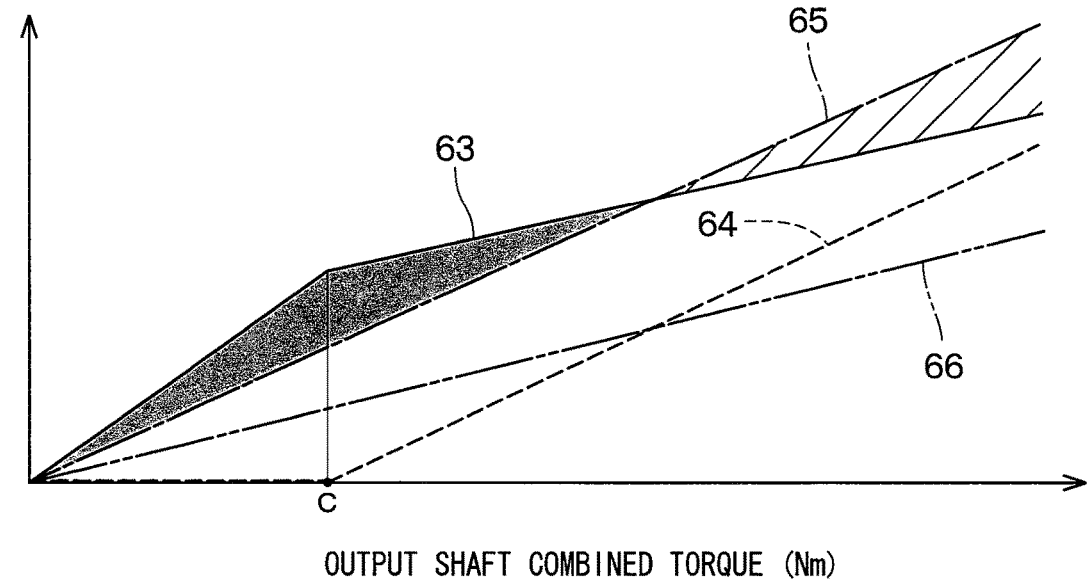
FIG. 20 is a characteristic diagram illustrating a relation between output shaft torque and output shaft combined torque in a case of Condition 1.

FIG. 20 illustrates a relation between the output shaft torque and the output shaft combined torque in a case of Condition 1. In FIG. 20, a characteristic line 63 of a solid line shows output shaft torque on the large torque side by the differential mechanism 20 in the present embodiment, and a characteristic line 64 of a broken line shows output shaft torque on the small torque side. A characteristic line 65 of a dashed-dotted line shows output shaft torque on the large torque side by a differential mechanism provided with a general limited slip differential device of a torque proportional type (hereinafter, referred to as a comparative example), and a characteristic line 66 of a two-point broken line shows output shaft torque on the small torque side.

The differential mechanism 20 according to the present embodiment is in the locking state (differential locking state) from a state where the output shaft torque is zero until a state where the output shaft torque is C point (a point where the maximum torque capacity is equal to the output shaft combined torque). Therefore, from a state where the output shaft torque is zero until a state where the output shaft torque is C point, the output shaft torque (on the large torque side) as shown in the characteristic line 63 is equal to the output shaft combined torque and the output shaft torque (on the small torque side) as shown in the characteristic line 64 is zero. On the other hand, when the output shaft combined torque goes over C point, since the rotating discs 38 and the non-rotating discs 39 are caused to start to slide with each other, the inclination of the output shaft torque (on the large torque side) as shown in the characteristic line 63 is small. Since the differential torque is gradually lowered going over C point, the inclination of the output shaft torque (on the large torque side) is small and the differential torque rises with this small inclination being kept.

Figure 21:
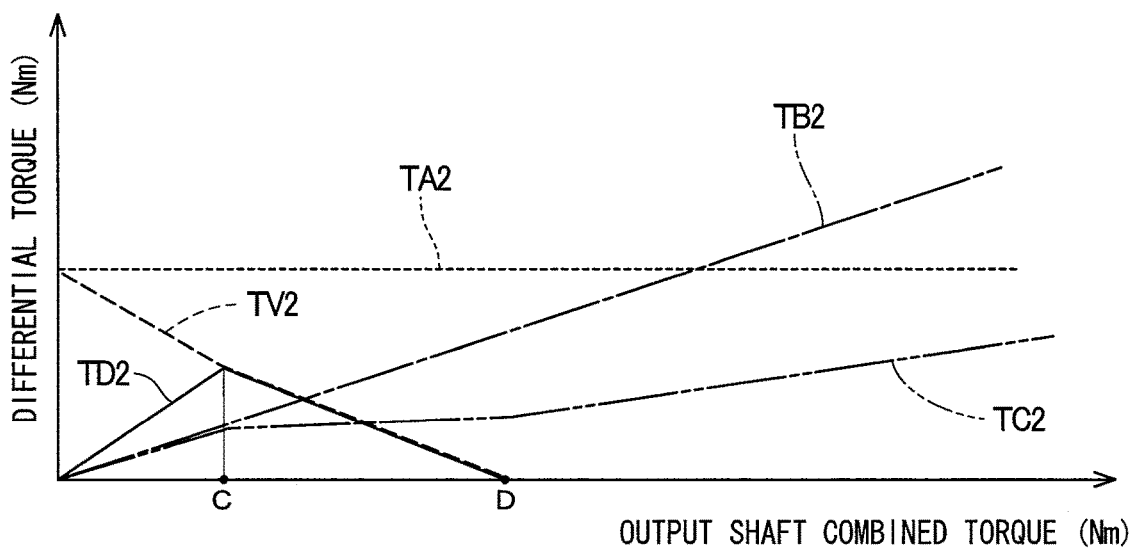
FIG. 21 is a characteristic diagram illustrating a relation between differential torque and output shaft combined torque in a case of Condition 2.

Next, FIG. 21 illustrates a relation between differential torque and output shaft combined torque in a case of Condition 2. In FIG. 21, a characteristic line of a short broken line shows differential torque TA2 by the load Fp, a characteristic line of a dashed-dotted line shows differential torque TB2 by the load Fm. In addition, a characteristic line of a dashed-two dotted line shows differential torque TC2 by the frictional force Fs2, and a characteristic line of a solid line shows differential torque TD2. In addition, C point in FIG. 21 shows a point where the maximum torque capacity transmitted by the rotating discs 38 and the non-rotating discs 39 becomes equal to the output shaft combined torque. In a case of Condition 2, the load Fm and the frictional force Fs2 are loads in the inverse direction to the load Fp. Therefore, the torque capacity TV2 by the rotating discs 38 and the non-rotating discs 39 is calculated according to the following Formula 8 and is represented by a characteristic line of a long broken line.

$$TV2 = TA2 - TB2 - TC2 \quad \text{[Formula 8]}$$

In a case of Condition 2, the frictional force Fs2 acts inversely to the load Fp, and the differential torque is made small. Accordingly, in a case of Condition 2, the maximum differential torque is smaller than in a case of Condition 1 and C point where the maximum torque capacity is equal to the output shaft combined torque is also smaller than in a case of Condition 1. In a region where the output shaft combined torque goes over C point, the rotating discs 38 and the non-rotating discs 39 start to slide with each other. Since the load Fm increases following the rise of the output shaft combined torque after C point, the torque capacity TV2 is lowered and the differential torque TD2 is also lowered. In addition, the load Fen is below zero going over D point (Fen<zero), and even when the hydraulic oil is supplied to the hydraulic chamber 47, since the piston 46 is kept to be in the stopping state, the differential torque TD2 is maintained as zero.

Figure 22:
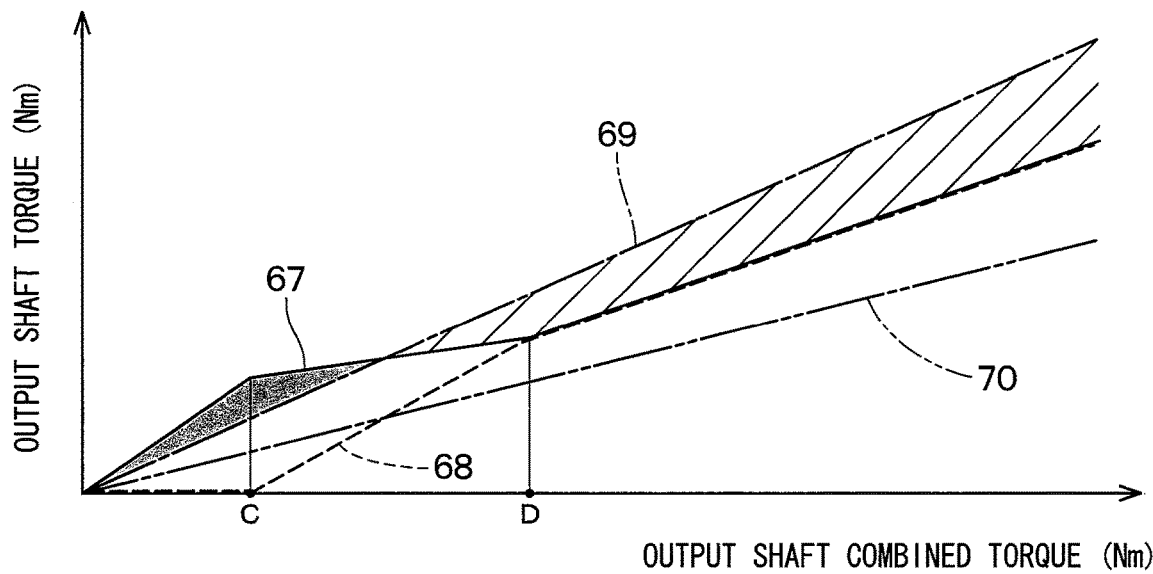
FIG. 22 is a characteristic diagram illustrating a relation between output shaft torque and output shaft combined torque in a case of Condition 2.

FIG. 22 illustrates a relation between the output shaft torque and the output shaft combined torque in a case of Condition 2. In FIG. 22, a characteristic line 67 of a solid line shows output shaft torque on the large torque side by the differential mechanism 20 in the present embodiment, and a characteristic line 68 of a broken line shows output shaft torque on the small torque side. A characteristic line 69 of a dashed-dotted line shows output shaft torque on the large torque side by a differential mechanism (hereinafter, referred to as a comparative example) provided with a general limited slip differential device of a torque proportional type, and a characteristic line 70 of a two-point broken line shows output shaft torque on the small torque side.

The differential mechanism 20 according to the present embodiment is in the locking state (differential locking state) from a state where the output shaft torque is zero until a state where the output shaft torque is C point. Therefore, from a state where the output shaft combined torque is zero until a state where the output shaft combined torque is C point, the output shaft torque (on the large torque side) as shown in the characteristic line 67 is equal to the output shaft combined torque and the output shaft torque (on the small torque side) as shown in the characteristic line 68 is zero. On the other hand, when the output shaft combined torque goes over C point, since the rotating discs 38 and the non-rotating discs 39 are caused to start to slide with each other, the inclination of the output shaft torque (on the large torque side) as shown in the characteristic line 67 is small. Since the differential torque is gradually lowered going over C point, the inclination of the output shaft torque (on the large torque side) is small and the differential torque rises to D point with this small inclination being kept. The differential torque becomes zero going over D point.

Here, in regions colored in gray in FIG. 20 and FIG. 22, the differential mechanism 20 in the present embodiment has the differential torque larger than the differential mechanism by the comparative example. Accordingly, the differential mechanism 20 can secure the differential torque largely in a region where the drive torque is relatively small, that is, the event that a lifetime of the left and right axle shafts 19L, 19R is so much affected occurs a little. As a result, in the regions colored in gray in FIG. 20 and FIG. 22, even in a situation where slippage of a vehicle provided with the differential mechanism by the comparative example occurs, the wheel loader 1 according to the present embodiment can suppress the slippage to generate an appropriate traction force.

On the other hand, in regions hatched in FIG. 20 and FIG. 22, the differential mechanism 20 in the present embodiment has the differential torque smaller than the differential mechanism by the comparative example. Accordingly, the differential mechanism 20 can suppress the differential torque to be small in a region where the drive torque is relatively large, that is, a lifetime of the left and right axle shafts 19L, 19R is so much affected. Here, in the regions hatched in FIG. 20 and FIG. 22, the wheel loader 1 slips with the output shaft torque smaller than the vehicle provided with the differential mechanism by the comparative example. However, in the hatched region, a large output shaft torque is generated and a traction force enough for executing a regular work is provided. Therefore, to suppress the differential torque to be small in this region does not lead to a large problem in the work of the wheel loader 1. In addition thereto, the differential mechanism 20 can lower frequency of the output shaft torque being more excessive than the differential mechanism by the comparative example. As a result, it is possible to extend the lifetime of the left and right axle shafts 19L, 19R.

In this way, the differential mechanism 20 according to the present embodiment can secure the differential torque largely in a region where the event that a lifetime of the left and right axle shafts 19L, 19R is so much affected occurs a little (in a region where the drive torque is relatively small). As a result, for example, when the wheel loader 1 travels on the upslope, the wheel loader 1 can be prevented from slipping at the time of travelling on a snowy road of which a friction coefficient of a ground road surface is low or the like to enhance the travelling performance. In addition, it is possible to enhance the working performance in a case of carrying out an excavating work using the working mechanism 6 in the wheel loader 1, that is, a work of inserting the working mechanism 6 into earth and sand loaded at low speeds. Further, the differential mechanism 20 mechanically reduces the differential torque to be small in accordance with increasing drive torque, thereby making it possible to lower the frequency of the excessive torque acting on the left and right axle shafts 19L, 19R. As a result, it is possible to extend the lifetime of the left and right axle shafts 19L, 19R.

Moreover, the differential mechanism 20 according to the present embodiment utilizes that the engaging reaction force between the pinion gear 33 and the right side gear 35 increases in proportion to the drive torque to transmit this engaging reaction force via the lever member 53 to the piston 46. As a result, the load Fen acting on the pressing plate 40 from the pressure ring 43 by the thrust force of the piston 46 can mechanically be lowered in inverse proportion to the drive torque. That is, the differential mechanism 20 mechanically reduces the differential torque to be small in accordance with the increasing drive torque, thus making it possible to extend the lifetime of the left and right axle shafts 19L, 19R. In this way, the differential mechanism 20 does not need various kinds of sensors and a control device for predicting the drive torque, a hydraulic control circuit for adjusting the thrust force of the piston in accordance with the predicted drive torque, and the like. Therefore, the rise of the cost can be suppressed.

In addition, in the differential mechanism 20 the lever member 53 is disposed between the right side gear 35 and the piston 46, and the lever ratio iL of the lever member 53 is defined by the distance La between the first abutting part F and the third abutting part A and by the distance Le between the first abutting part F and the second abutting part E. Accordingly, the movement quantity (the displacement quantity of the second abutting part E) of the right side gear 35 to the stroke quantity (the displacement quantity of the third abutting part A) of the piston 46 can be reduced to be small according to the lever ratio iL of the lever member 53. Thereby, the axial movement quantity of the right side gear 35 can be reduced to be small while securing the appropriate stroke of the piston 46. Accordingly, even when the right side gear 35 moves axially according to the supply/discharge of the hydraulic oil to/from the hydraulic chamber 47, a changing quantity of backlash between the pinion gear 33 and the right side gear 35 can be suppressed. As a result, noises and vibrations at the engaging between the pinion gear 33 and the right side gear 35 can be suppressed and deterioration in transmission efficiency between the pinion gear 33 and the right side gear 35 and reduction in lifetime between the pinion gear 33 and the right side gear 35 can be suppressed.

Further, the four rectangular projecting parts 40B are disposed on the outer peripheral side of the pressing plate 40, and the four rectangular projecting parts 40B are engaged with the four engagement recessed parts 26H arranged on the axial end surface 26F of the second case 26. Therefore, even when the rotating discs 38 and the non-rotating discs 39 are abraded, the four rectangular projecting parts 40B block the pressing plate 40 from moving to the rotating disc 38-side more than needed. Thereby, the right side gear 35 can be prevented from approaching the pinion gear 33 to hold the appropriate backlash between the right side gear 35 and the pinion gear 33. As a result, the deterioration in transmission efficiency between the pinion gear 33 and the right side gear 35 and the reduction in lifetime between the pinion gear 33 and the right side gear 35 can be suppressed.

In this way, a vehicular axle device comprises: the left and right axle shafts 19L, 19R to which the left and right front wheels 5 are respectively attached; the hollow differential body 14 that is disposed between the left and right axle tubes 15L, 15R for accommodating the left and right axle shafts 19L, 19R and on both sides of which in the left-right direction the partition walls 14B, 14C each having the through hole 14D penetrating therethrough in the left-right direction are respectively arranged; and the differential mechanism 20 that is disposed between the left and right partition walls 14B, 14C of the differential body 14 to transmit the rotational force of the engine 7 to the left and right axle shafts 19L, 19R, wherein the differential mechanism 20 includes: the differential case 23 that is rotatably supported on the left and right retainers 21, 41 respectively attached in the through holes 14D of the left and right partition walls 14B, 14C and is rotated by the engine 7; the pinion gear 33 that is disposed in the differential case 23 and rotates together with the differential case 23; the left and right side gears 34, 35 that are arranged in the differential case 23 and are respectively engaged with the pinion gear 33; and the left and right transmission shafts 36, 37 that are connected to the left and right side gears 34, 35 to transmit the rotation of the differential case 23 to the left and right axle shafts 19L, 19R. The differential case 23 is provided therein with the plurality of rotating discs 38 that are spline coupled to the outer peripheral side of the right side gear 35 of the left and right side gears 34, 35 and the plurality of non-rotating discs 39 that are arranged between the plurality of rotating discs 38 and are non-rotatable relative to the differential case 23 and are movable relative to the differential case 23 in the left-right direction; the pressure ring 43 is disposed between the right retainer 41, which is positioned in the right side gear 35-side, of the left and right retainers 21, 41, and the rotating disc 38 to press the rotating disc 38 toward the non-rotating disc 39; the piston 46 is disposed in the right retainer 41-side, the piston 46 applying the load on the pressure ring 43 to bring the rotating discs 38 and the non-rotating discs 39 into contact and couple the left and right transmission shafts 36, 37; and the lever member 53 is disposed between the differential case 23, the right side gear 35 and the pressure ring 43, the lever member 53 transmitting the reaction force due to the engagement between the pinion gear 33 and the right side gear 35 to the pressure ring 43 to control the load to be applied to the pressure ring 43 from the piston 46.

According to this configuration, by utilizing that the engaging reaction force between the pinion gear 33 and the right side gear 35 increases in proportion to the drive torque, this engaging reaction force can be transmitted via the lever member 53 to the pressure ring 43. As a result, the load acting on the pressure ring 43 from the piston 46 can mechanically be lowered in inverse proportion to the drive torque. As a result, the differential mechanism 20 mechanically reduces the differential torque to be small in accordance with the increasing drive torque, thus making it possible to extend the lifetime of the left and right axle shafts 19L, 19R arranged after the differential mechanism 20.

In the embodiment, the lever member 53 is provided with the first abutting part F that abuts on the differential case 23, the second abutting part E that abuts on the right side gear 35 and receives the reaction force by the engagement between the pinion gear 33 and the right side gear 35, and the third abutting part A that abuts on the pressure ring 43 and transmits the reaction force by the engagement between the pinion gear 33 and the right side gear 35 to the pressure ring 43 using the first abutting part F as a fulcrum. According to this configuration, the engaging reaction force between the pinion gear 33 and the right side gear 35 acts on the second abutting part E as the point of force of the lever member 53. Thereby, the third abutting part A as the point of operation of the lever member 53 is rotationally displaced on a basis of the first abutting part F. As a result, the lever member 53 transmits the engaging reaction force to the pressure ring 43 according to the lever ratio iL defined by the respective positions of the first abutting part F, the second abutting part E and the third abutting part A. Accordingly, by changing the lever ratio iL of the lever member 53, the load Fen acting on the rotating disc 38 via the pressing plate 40 from the pressure ring 43 can be adjusted as needed.

In the embodiment, the lever member 53 has the intermediate part in the longitudinal direction composed of a member that is bent in a chevron, and the one end part 53A in the longitudinal direction that is provided with the first abutting part F, the other end part 53B in the longitudinal direction that is provided with the third abutting part A, and the intermediate part 53C in the longitudinal direction that is provided with the second abutting part E. According to this configuration, by using the member bent in a chevron, it is possible to easily form the lever member 53 provided with the first abutting part F as the fulcrum point, the second abutting part E as the point of force, and the third abutting part A as the point of operation. In addition, by changing the position of the bent part, the lever ratio iL of the lever member 53 can be changed as needed.

In the embodiment, the differential case 23 is provided therein with the pressing plate 40 that is disposed between the pressure ring 43 and the rotating disc 38 to transmit the pressing force of the pressure ring 43 to the rotating disc 38, the rectangular projecting parts 40B are disposed on the pressing plate 40 projecting to the outer peripheral side, and the differential case 23 is provided with the engagement recessed parts 26H that regulate the movement quantity of the pressing plate 40 by the engagement of the rectangular projecting parts 40B therewith. According to this configuration, even when the rotating discs 38 and the non-rotating discs 39 are abraded, the engagement of the rectangular projecting parts 40B with the engagement recessed parts 26H limits the movement quantity of the pressing plate 40 to the rotating disc 38-side. Accordingly, the displacement quantity Da of the third abutting part A in the lever member 53 can be prevented from increasing to suppress the right side gear 35 from approaching the pinion gear 33 more than needed. As a result, the appropriate backlash can be held between the right side gear 35 and the pinion gear 33 to extend the lifetime of the right side gear 35 and the pinion gear 33.

It should be noted that the embodiment shows as an example a case where the rotating discs 38 are spline coupled on the outer peripheral side of the right side gear 35 out of the left and right side gears 34, 35. However, the present invention is not limited thereto, but rotating discs may be spline coupled on the outer peripheral side of the left side gear 34, for example. In this case, a pressure ring is disposed between the left retainer 21 out of the left and right retainers 21, 41 and the rotating disc 38, the left retainer 21 is provided with a piston, and a lever member is disposed between a differential case, the left side gear 34 and the pressure ring.

In addition, the embodiment shows as an example a case of bending an intermediate part of a trapezoidal plate body in the longitudinal direction to be in a chevron and form the lever member 53 having the one end part 53A that is the first abutting part F, the other end part 53B that is the third abutting part A, and the intermediate part 53C that is the second abutting part E. However, the present invention is not limited thereto, but for example, a projecting part may be disposed on an intermediate part of a flat plate body in the longitudinal direction, thereby forming a lever member having both end parts in the longitudinal direction that are first and third abutting parts and the projecting part that is a second abutting part.

In addition, the embodiment shows as an example a case of using the piston 46 of a hydraulic pressure type as the actuator for applying a load to the pressure ring 43. However, the present invention is not limited thereto, but for example, a piston that is driven by a water pressure or an air pressure, an electric motor, an actuator that uses an exciting force by an electromagnet, and the like may be used.

Further, the embodiment shows as an example a case of the wheel loader 1 as the vehicle provided with the rear axle device 11 and the front axle device 12. The present invention is, however, not limited thereto, but, for example, may be applied widely to other wheel type construction machines such as a wheel type excavator.

DESCRIPTION OF REFERENCE NUMERALS

4: REAR WHEEL
5: FRONT WHEEL
11: REAR AXLE DEVICE
12: FRONT AXLE DEVICE
14: DIFFERENTIAL BODY
15L: LEFT AXLE TUBE
15R: RIGHT AXLE TUBE
19L: LEFT AXLE SHAFT
19R: RIGHT AXLE SHAFT
20: DIFFERENTIAL MECHANISM
21: LEFT RETAINER
23: DIFFERENTIAL CASE
26: SECOND CASE
26H: ENGAGEMENT RECESSED PART
33: PINION GEAR
34: LEFT SIDE GEAR
35: RIGHT SIDE GEAR (ONE SIDE GEAR)
36: LEFT TRANSMISSION SHAFT
37: RIGHT TRANSMISSION SHAFT
38: ROTATING DISC
39: NON-ROTATING DISC
40: PRESSING PLATE

40B: RECTANGULAR PROJECTING PART (PROJECTING PART)
41: RIGHT RETAINER (ONE RETAINER)
43: PRESSURE RING
46: PISTON (ACTUATOR)
53: LEVER MEMBER
53A: ONE END PART
53B: OTHER END PART
53C: INTERMEDIATE PART
F: FIRST ABUTTING PART
E: SECOND ABUTTING PART
A: THIRD ABUTTING PART

The invention claimed is:

1. A vehicular axle device, comprising:
left and right axle shafts to which left and right wheels are respectively attached;
a hollow differential body that is disposed between left and right axle tubes for accommodating the left and right axle shafts and on both sides of which in a left-right direction partition walls each having a through hole penetrating in the left-right direction are respectively arranged; and
a differential mechanism that is disposed between the left and right partition walls of the differential body to transmit a rotational force of a drive source to the left and right axle shafts, wherein the differential mechanism includes:
a differential case that is rotatably supported on left and right retainers respectively attached in the through holes of the left and right partition walls and is rotated by the drive source;
a pinion gear that is disposed in the differential case and rotates together with the differential case;
left and right side gears that are arranged in the differential case and are engaged with the pinion gear; and
left and right transmission shafts that are connected to the left and right side gears to transmit the rotation of the differential case to the left and right axle shafts, characterized in that:
the differential case is provided therein with a plurality of rotating discs that are spline coupled to an outer peripheral side of one side gear of the left and right side gears and a plurality of non-rotating discs that are arranged between the plurality of rotating discs and are non-rotatable relative to the differential case and are movable relative to the differential case in the left-right direction;
a pressure ring is disposed between one retainer, which is positioned in the one side gear-side, of the left and right retainers and the rotating disc to press the rotating discs toward the non-rotating discs;
an actuator is disposed in the one retainer-side, the actuator applying a load on the pressure ring to bring the rotating discs and the non-rotating discs into contact and couple the left and right transmission shafts; and
a lever member is disposed between the differential case, the one side gear and the pressure ring, the lever member transmitting a reaction force due to the engagement between the pinion gear and the one side gear to the pressure ring to control the load to be applied to the pressure ring from the actuator.

2. The vehicular axle device according to claim 1, wherein the lever member is provided with:
a first abutting part that abuts on the differential case;
a second abutting part that abuts on the one side gear and receives the reaction force by the engagement between the pinion gear and the one side gear; and
a third abutting part that abuts on the pressure ring and transmits the reaction force by the engagement between the pinion gear and the one side gear to the pressure ring using the first abutting part as a fulcrum.

3. The vehicular axle device according to claim 2, wherein the lever member is provided with an intermediate part in the longitudinal direction, the intermediate part being composed of a member that is bent in a chevron, wherein the lever member includes:
one end part in the longitudinal direction that is provided with the first abutting part;
the other end part in the longitudinal direction that is provided with the third abutting part; and
the intermediate part in the longitudinal direction that is provided with the second abutting part.

4. The vehicular axle device according to claim 1, wherein the differential case is provided therein with a pressing plate, the pressing plate being disposed between the pressure ring and the rotating disc to transmit a pressing force of the pressure ring to the rotating disc,
the pressing plate is provided with a projecting part that projects to the outer peripheral side, and
the differential case is provided with an engagement recessed part, the engagement recessed part regulating a movement quantity of the pressing plate by the engagement of the projecting part with the engagement recessed part.

* * * * *